(12) United States Patent
Ushijima et al.

(10) Patent No.: US 10,243,406 B2
(45) Date of Patent: Mar. 26, 2019

(54) WIRELESS POWER TRANSFER SYSTEM

(71) Applicant: WQC, INC., Tokyo (JP)

(72) Inventors: Masakazu Ushijima, Tokyo (JP); Hajime Yuasa, Yamanashi (JP); Go Ogino, Gunma (JP)

(73) Assignee: WQC, Inc., Tokyo (JP)

( * ) Notice: Subject to any disclaimer, the term of this patent is extended or adjusted under 35 U.S.C. 154(b) by 299 days.

(21) Appl. No.: 15/310,222

(22) PCT Filed: Sep. 19, 2014

(86) PCT No.: PCT/JP2014/004827
§ 371 (c)(1),
(2) Date: Nov. 10, 2016

(87) PCT Pub. No.: WO2015/173850
PCT Pub. Date: Nov. 19, 2015

(65) Prior Publication Data
US 2017/0149285 A1    May 25, 2017

(30) Foreign Application Priority Data

May 14, 2014   (WO) .................. PCT/JP2014/002552

(51) Int. Cl.
*H02J 50/12* (2016.01)
*H02J 50/80* (2016.01)

(52) U.S. Cl.
CPC ............... *H02J 50/12* (2016.02); *H02J 50/80* (2016.02)

(58) Field of Classification Search
None
See application file for complete search history.

(56) References Cited

U.S. PATENT DOCUMENTS

| | | | |
|---|---|---|---|
| 2010/0276995 A1 | 11/2010 | Marzetta et al. | |
| 2012/0161534 A1 | 6/2012 | Urano | |
| 2012/0169131 A1* | 7/2012 | Choudhary | H02J 5/005 307/104 |

(Continued)

FOREIGN PATENT DOCUMENTS

| | | |
|---|---|---|
| EP | 0253345 | 1/1988 |
| EP | 2552030 | 1/2013 |

(Continued)

OTHER PUBLICATIONS

European Supplementary Partial Search Report, EP Application No. 14891694, dated Mar. 9, 2018.

(Continued)

*Primary Examiner* — Jeffrey M Shin
(74) *Attorney, Agent, or Firm* — Perman & Green, LLP

(57) ABSTRACT

In a wireless power transfer system, a resonant circuit is formed on the secondary coil side, phase information of a resonant current flowing in the resonant circuit is detected, and, based on this phase information, a driving frequency is determined so that the current phase of a driving current flowing in a primary coil slightly delays from the voltage phase, thereby driving the primary coil. A Q valued determined based on a leakage inductance of the secondary coil, a capacitance of a resonant capacitor, and an equivalent load resistance is set to a value greater than or equal to a value determined by $Q=2/k^2$ (k is a coupling coefficient).

14 Claims, 21 Drawing Sheets

(56) References Cited

U.S. PATENT DOCUMENTS

| | | |
|---|---|---|
| 2014/0035358 A1 | 2/2014 | Ichikawa |
| 2014/0087688 A1 | 3/2014 | Tzanidis et al. |
| 2015/0188319 A1* | 7/2015 | Iwawaki ................. H02J 7/025 |
| | | 307/104 |
| 2015/0326028 A1 | 11/2015 | Suzuki et al. |

FOREIGN PATENT DOCUMENTS

| | | |
|---|---|---|
| EP | 2713475 | 4/2014 |
| JP | 6373837 | 4/1988 |
| JP | 2002272134 | 9/2002 |
| JP | 2008125198 | 5/2008 |
| JP | 2011097671 | 5/2011 |
| JP | 4921466 | 4/2012 |
| JP | 5190108 | 4/2013 |
| JP | 2013153627 | 8/2013 |
| JP | 2014033516 | 2/2014 |
| WO | 2007008646 | 1/2007 |
| WO | 2008118178 | 10/2008 |
| WO | 2012090700 | 7/2012 |
| WO | 2013042224 | 3/2013 |

OTHER PUBLICATIONS

International Search Report, International Application No. PCT/JP2014/004827, dated Dec. 22, 2014.

* cited by examiner a
Resonance current
waveform information
including distortion b
Fundamental component of
resonance current
waveform information Figure 11: Equivalent circuit for the coupled resonator system.

WIRELESS POWER TRANSFER SYSTEM

CROSS REFERENCE TO RELATED APPLICATIONS

This application is the National Stage of International Application No. PCT/JP2014/004827 having an International Filing Date of 19 Sep. 2014, which designated the United States of America, and which International Application was published under PCT Article 21 (2) as WO Publication 2015/173850 A1, and which claims priority from and the benefit of International Application No. PCT/JP2014/002552, filed on 14 May 2014, the disclosures of which are incorporated herein by reference in their entireties.

DESCRIPTION

1. Field

The presently disclosed embodiment relates to a wireless power transfer system and, in particular, relates to a wireless power transfer system in which a primary coil connected to a high-frequency power source and a secondary coil connected to a load are disposed so as to be isolated from each other with a coupling coefficient k, thereby supplying the power from the primary coil to the secondary coil in a non-contact manner.

2. Brief Description of Related Developments

In recent years, after the magnetic field resonance (magnetic resonance) type wireless power transfer (non-contact power feeding) was proposed, its application has been rapidly spreading. In particular, great interest has been shown for power transfer between a primary coil and a secondary coil in the case where a coupling coefficient k between the coils is small and further the coupling coefficient k changes significantly.

FIG. 24 is a block diagram showing a configuration of a conventional magnetic field resonance type wireless power transfer system and FIG. 25 is an equivalent circuit diagram thereof.

A wireless power transfer system 200 includes a primary-side circuit (Source Electronics) 210 and a secondary-side circuit (Device Electronics) 230.

The primary-side circuit 210 includes an AC/DC conversion circuit 213 configured to convert an alternating current supplied from an alternating current (AC) power source (AC Mains) 211 into a direct current, a high-frequency driving circuit 215 configured to convert this direct current (DC) into a predetermined high frequency (RF) and to amplify and output it, a primary-side resonator (Source Resonator) 219 supplied with this high frequency as driving power, and an impedance matching circuit (Impedance Matching Networks) 217 configured to perform impedance matching with the primary-side resonator 219.

The secondary-side circuit 230 includes a secondary-side resonator (Device Resonator) 231, an impedance matching circuit (IMN) 233, a RF/DC rectifying circuit (RF/DC Rectifier) 235 configured to convert a high frequency (RF) into a direct current and to rectify and output it, and a load (Load) 237 supplied with the rectified direct current power.

The primary-side resonator 219 includes a primary coil and a primary resonance capacitor, while the secondary-side resonator 231 includes a secondary coil and a secondary resonance capacitor.

In the magnetic field resonance type wireless power transfer, by matching the resonance frequencies of the primary-side resonator 219 and the secondary-side resonator 231 to resonate both resonators, highly efficient power transfer is achieved even between the coils distanced from each other.

Further, in the magnetic field resonance type, the respective resonators 219 and 231 are controlled by matching the impedance conditions using the impedance matching circuits (IMNs) 217 and 233.

In the equivalent circuit diagram shown in FIG. 25, Vg, Rg, Cs, Ls, and Rs of the primary-side circuit 210 respectively denote a high-frequency driving voltage, an equivalent resistance of the high-frequency driving circuit, a capacitance of the resonance capacitor, a self-inductance of the primary coil, and an equivalent resistance of the primary coil, while RL, Cd, Ld, and Rd of the secondary-side circuit respectively denote an equivalent resistance of the load, a capacitance of the resonance capacitor, a self-inductance of the secondary coil, and an equivalent resistance of the secondary coil. Further, M denotes a mutual inductance between the primary coil and the secondary coil.

Herein, in the magnetic field resonance type, it is essential to provide the primary-side resonator 219 shown in FIG. 24, which is the most distinctive feature of the magnetic field resonance type. Therefore, as shown in FIG. 25, the primary resonance capacitor Cs is the essential component.

In theoretical consideration of the wireless power transfer, it can be said that a coupling coefficient k of a leakage magnetic flux transformer formed by a primary coil and a secondary coil changes and further that a load also changes simultaneously. Further, it can be said that since there are many variable magnetic parameters in terms of constituent electronic circuits, it is very difficult to simultaneously achieve high efficiency, stability, reliability, and so on in the wireless power transfer. In addition, under the EMC (Electro-Magnetic Compatibility) regulatory arrangements in recent years, it is necessary to employ the soft-switching ZVS (Zero Voltage Switching) technique configured for reducing noise power (noise electric field strength).

Accordingly, even if an attempt is made to obtain optimal values of parameters of components of a driving circuit, values of the respective parameters do not necessarily cooperate with each other and are often in a trade-off relationship to conflict with each other, and therefore, it is extremely difficult to simultaneously achieve optimal values of the respective parameters.

Consequently, in the conventional wireless power transfer, the power control is achieved by sacrificing some of the parameters. Currently, a practical value is obtained for the magnitude of power transferred in the wireless power transfer, but there is a problem that heat generation in a driven primary coil is large. This heat generation is almost due to copper loss and thus it is aimed to minimize this copper loss.

In the wireless power transfer, when resonance circuits are provided on both the primary side and the secondary side, a resonance frequency of the primary side is constant regardless of a distance between coils, while a resonance frequency of the secondary side changes when the distance between the coils is changed to cause a change in coupling coefficient. This is given by the following formula, where $L_2$ is an inductance of a secondary coil, Cp is a resonance capacitance, and k is a coupling coefficient.

$$f_2 = \frac{1}{2\pi\sqrt{(1-k^2)L_2 C_p}} \qquad \text{[Formula 1]}$$

Therefore, in the conventional magnetic field resonance type, resonance frequencies of the primary side and the secondary side coincide with each other only when the distance between the coils is a predetermined distance, but they differ from each other when the distance between the coils is other than the predetermined distance.

Consequently, when the primary coil and the secondary coil are in a predetermined positional relationship, practically sufficient efficiency can be obtained, while, when the distance between the coils deviates from a predetermined distance relationship or when a center axis of the primary coil and a center axis of the secondary coil are offset from each other, the power factor as seen from the primary coil decreases rapidly. In this case, there is a problem that while the power transfer is enabled, its efficiency is poor so that heat generation further increases.

Further, there is also a problem that, in order to ensure ZVS operation of a switching element configured to drive the primary coil, the phase relationship between the primary coil and the secondary coil should be in a specific range and thus that the ZVS operation can only be achieved under very limited conditions.

Therefore, in the conventional wireless power transfer, in order to constantly ensure the ZVS operation, measures are taken, such as changing a driving frequency according to a certain program while monitoring a condition of a load.

SUMMARY

It is an object of the presently disclosed embodiment to solve part of the above-mentioned various problems caused by the conventional magnetic field resonance type.

In particular, it is an object of the presently disclosed embodiment to provide a wireless power transfer system that can simultaneously maintain power factors as seen from both the driving means side of a primary coil and the primary coil in an excellent relationship to achieve efficient power transfer even when the condition is changed, such as when the distance between the coils is changed or when a center axis of the primary coil and a center axis of the secondary coil are offset from each other.

Further, it is an object of the presently disclosed embodiment to provide a wireless power transfer system that performs driving with high robustness and high efficiency by reducing both a copper loss and a switching loss with a simple circuit by automatically obtaining a driving frequency optimal for performing efficient power transfer.

According to a first aspect of the presently disclosed embodiment, there is provided a wireless power transfer system in which a primary coil connected to a high-frequency power source and a secondary coil connected to a load are disposed so as to be isolated from each other with a coupling coefficient k, thereby supplying power from the primary coil to the secondary coil in a non-contact manner, the system comprising: a resonance current phase detection means forming a resonance circuit by connecting a resonance capacitor to the secondary coil and configured to detect phase information of a resonance current flowing through the resonance capacitor; a phase information transfer means configured to transfer the detected phase information without phase delay; and a driving circuit configured to determine, based on the phase information, a driving frequency so that a current phase of a driving current flowing in the primary coil slightly delays from a voltage phase of a driving voltage applied to the primary coil, thereby driving the primary coil, wherein a Q value determined based on a leakage inductance of the secondary coil, a capacitance of the resonance capacitor, and an equivalent load resistance on the secondary coil side is set to a value greater than or equal to a value determined by $Q=2/k^2$.

According to a second aspect of the presently disclosed embodiment, there is provided a wireless power transfer system in which a primary coil connected to a high-frequency power source and a secondary coil connected to a load are disposed so as to be isolated from each other with a coupling coefficient k, thereby supplying power from the primary coil to the secondary coil in a non-contact manner, the system comprising: a resonance current phase detection means forming a resonance circuit by connecting a resonance capacitor to the secondary coil and configured to detect phase information of a resonance current flowing in the secondary coil; a phase information transfer means configured to transfer the detected phase information without phase delay; and a driving circuit configured to determine, based on the phase information, a driving frequency so that a current phase of a driving current flowing in the primary coil slightly delays from a voltage phase of a driving voltage applied to the primary coil, thereby driving the primary coil, wherein a Q value determined based on a leakage inductance of the secondary coil, a capacitance of the resonance capacitor, and an equivalent load resistance on the secondary coil side is set to a value greater than or equal to a value determined by $Q=2/k^2$.

According to a third aspect of the presently disclosed embodiment, there is provided a wireless power transfer system in which a primary coil connected to a high-frequency power source and a secondary coil connected to a load are disposed so as to be isolated from each other with a coupling coefficient k, thereby supplying power from the primary coil to the secondary coil in a non-contact manner, the system comprising: a resonance current phase detection means forming a resonance circuit by connecting a resonance capacitor to the secondary coil and configured to detect, from the primary coil, phase information of a resonance current flowing in the resonance circuit; a phase information transfer means configured to transfer the detected phase information without phase delay; and a driving circuit configured to determine, based on the phase information, a driving frequency so that a current phase of a driving current flowing in the primary coil slightly delays from a voltage phase of a driving voltage applied to the primary coil, thereby driving the primary coil, wherein a Q value determined based on a leakage inductance of the secondary coil, a capacitance of the resonance capacitor, and an equivalent load resistance on the secondary coil side is set to a value greater than or equal to a value determined by $Q=2/k^2$.

According to a fourth aspect of the presently disclosed embodiment, there is provided a wireless power transfer system in which a primary coil connected to a high-frequency power source and a secondary coil connected to a load are disposed so as to be isolated from each other with a coupling coefficient k, thereby supplying power from the primary coil to the secondary coil in a non-contact manner, the system comprising: a resonance current phase detection means forming a resonance circuit by connecting a resonance capacitor to the secondary coil and configured to detect phase information of a resonance current based on a waveform obtained by superimposing and combining one of a waveform of a resonance current flowing through the resonance capacitor, a waveform of a resonance current flowing in the secondary coil, and a waveform of a resonance current flowing in the primary coil, and an inverted integrated waveform of the one of the waveforms; a phase information transfer means configured to transfer the detected phase information without phase delay; and a driving circuit configured to determine, based on the phase information, a driving frequency so that a current phase of a driving current flowing in the primary coil slightly delays from a voltage phase of a driving voltage applied to the primary coil, thereby driving the primary coil, wherein a Q value determined based on a leakage inductance of the secondary coil, a capacitance of the resonance capacitor, and an equivalent load resistance on the secondary coil side is set to a value greater than or equal to a value determined by $Q=2/k^2$.

According to a fifth aspect of the presently disclosed embodiment, in any of the first to fourth aspects, a filter configured to remove distortion included in a waveform of the resonance current and to extract only a fundamental wave is provided.

According to a sixth aspect of the presently disclosed embodiment, in any of the first to fifth aspects, the driving circuit includes a switching means configured to drive the primary coil and the switching means performs power control by changing an on-off duty cycle thereof, turning on the switching means based on the phase information, and turning off the switching means after a lapse of a predetermined time.

According to a seventh aspect of the presently disclosed embodiment, in the first or fourth aspect, the resonance current phase detection means detects the phase information from a current flowing through a small-capacity capacitor connected in parallel to the resonance capacitor.

According to an eighth aspect of the presently disclosed embodiment, there is provided a wireless power transfer system including a primary coil connected to a high-frequency power source, a secondary coil connected to a load, and a third coil disposed close to the secondary coil or including the secondary coil as an autotransformer and wound so as to step down a voltage induced in the secondary coil, wherein the primary coil and the secondary coil are disposed so as to be isolated from each other with a coupling coefficient k, thereby supplying power from the primary coil to the third coil via the secondary coil in a non-contact manner, the system comprising: a resonance current phase detection means forming a resonance circuit by connecting a resonance capacitor to the secondary coil and configured to detect phase information of a resonance current flowing through the resonance capacitor; a phase information transfer means configured to transfer the detected phase information without phase delay; and a driving circuit configured to determine, based on the phase information, a driving frequency so that a current phase of a driving current flowing in the primary coil slightly delays from a voltage phase of a driving voltage applied to the primary coil, thereby driving the primary coil, wherein a Q value determined based on a leakage inductance of the secondary coil, a capacitance of the resonance capacitor, and an equivalent load resistance on the secondary coil side is set to a value greater than or equal to a value determined by $Q=2/k^2$.

According to a ninth aspect of the presently disclosed embodiment, there is provided a wireless power transfer system including a primary coil connected to a high-frequency power source, a secondary coil connected to a load, and a third coil disposed close to the secondary coil or included in an autotransformer including the secondary coil, the third coil being wound so as to step down a voltage induced in the secondary coil, wherein the primary coil and the secondary coil are disposed so as to be isolated from each other with a coupling coefficient k, thereby supplying power from the primary coil to the secondary coil in a non-contact manner, the system comprising: a resonance current phase detection means forming a resonance circuit by connecting a resonance capacitor to the secondary coil and configured to detect phase information of a resonance current flowing in the secondary coil; a phase information transfer means configured to transfer the detected phase information without phase delay; and a driving circuit configured to determine, based on the phase information, a driving frequency so that a current phase of a driving current flowing in the primary coil slightly delays from a voltage phase of a driving voltage applied to the primary coil, thereby driving the primary coil, wherein a Q value determined based on a leakage inductance of the secondary coil, a capacitance of the resonance capacitor, and an equivalent load resistance on the secondary coil side is set to a value greater than or equal to a value determined by $Q=2/k^2$.

According to a tenth aspect of the presently disclosed embodiment, there is provided a wireless power transfer system including a primary coil connected to a high-frequency power source, a secondary coil connected to a load, and a third coil disposed close to the secondary coil or included in an autotransformer including the secondary coil, the third coil being wound so as to step down a voltage induced in the secondary coil, wherein the primary coil and the secondary coil are disposed so as to be isolated from each other with a coupling coefficient k, thereby supplying power from the primary coil to the secondary coil in a non-contact manner, the system comprising: a resonance current phase detection means forming a resonance circuit by connecting a resonance capacitor to the secondary coil and configured to detect, from the primary coil, phase information of a resonance current flowing in the resonance circuit; a phase information transfer means configured to transfer the detected phase information without phase delay; and a driving circuit configured to determine, based on the phase information, a driving frequency so that a current phase of a driving current flowing in the primary coil slightly delays from a voltage phase of a driving voltage applied to the primary coil, thereby driving the primary coil, wherein a Q value determined based on a leakage inductance of the secondary coil, a capacitance of the resonance capacitor, and an equivalent load resistance on the secondary coil side is set to a value greater than or equal to a value determined by $Q=2/k^2$.

According to an eleventh aspect of the presently disclosed embodiment, there is provided a wireless power transfer system including a primary coil connected to a high-frequency power source, a secondary coil connected to a load, and a third coil disposed close to the secondary coil or included in an autotransformer including the secondary coil, the third coil being wound so as to step down a voltage induced in the secondary coil, wherein the primary coil and the secondary coil are disposed so as to be isolated from each other with a coupling coefficient k, thereby supplying power from the primary coil to the secondary coil in a non-contact manner, the system comprising: a resonance current phase detection means forming a resonance circuit by connecting a resonance capacitor to the secondary coil and configured to detect phase information of a resonance current based on a waveform obtained by superimposing and combining one of a waveform of a resonance current flowing through the resonance capacitor, a waveform of a resonance current flowing in the secondary coil, and a waveform of a resonance current flowing in the primary coil, and an inverted integrated waveform of the one of the waveforms; a phase information transfer means configured to transfer the detected phase information without phase delay; and a driving circuit configured to determine, based on the phase information, a driving frequency so that a current phase of a driving current flowing in the primary coil slightly delays from a voltage phase of a driving voltage applied to the primary coil, thereby driving the primary coil, wherein a Q value determined based on a leakage inductance of the secondary coil, a capacitance of the resonance capacitor, and an equivalent load resistance on the secondary coil side is set to a value greater than or equal to a value determined by $Q=2/k^2$.

According to a twelfth aspect of the presently disclosed embodiment, in any of the eighth to eleventh aspects, a filter configured to remove distortion included in a waveform of the resonance current and to extract only a fundamental wave is provided.

According to a thirteenth aspect of the presently disclosed embodiment, in any of the eighth to twelfth aspects, the driving circuit includes a switching means configured to drive the primary coil and the switching means performs power control by changing an on-off duty cycle thereof, turning on the switching means based on the phase information, and turning off the switching means after a lapse of a predetermined time.

According to a fourteenth aspect of the presently disclosed embodiment, in the eighth or eleventh aspect, the resonance current phase detection means detects the phase information from a current flowing through a small-capacity capacitor connected in parallel to the resonance capacitor.

According to the presently disclosed embodiment, a better result can be obtained by not providing a resonance circuit is not provided to a primary coil. If a resonance circuit is provided only to a secondary coil by connecting a resonance capacitor to the secondary coil, a resonance current does not flow in the primary coil so that heat generation in the primary coil is suppressed. However, it is optional to utilize a primary side resonance by, for example, using technologies such as a variable capacitor in combination.

Further, being not bound by a resonance frequency of the primary coil, it is possible to automatically select, as a driving frequency, a frequency with the best power factor as seen from the primary coil side so that the robustness is largely improved.

Further, in the presently disclosed embodiment, since ZVS operation is constantly maintained, it is possible to employ a half-bridge circuit configuration as a driving circuit so that a system can be achieved with a simple circuit configuration compared to the conventional wireless power transfer system.

DETAILED DESCRIPTION

Hereinbelow, an aspect of a wireless power transfer system according to the presently disclosed embodiment will be described in detail with reference to the accompanying drawings.

Figure 1:
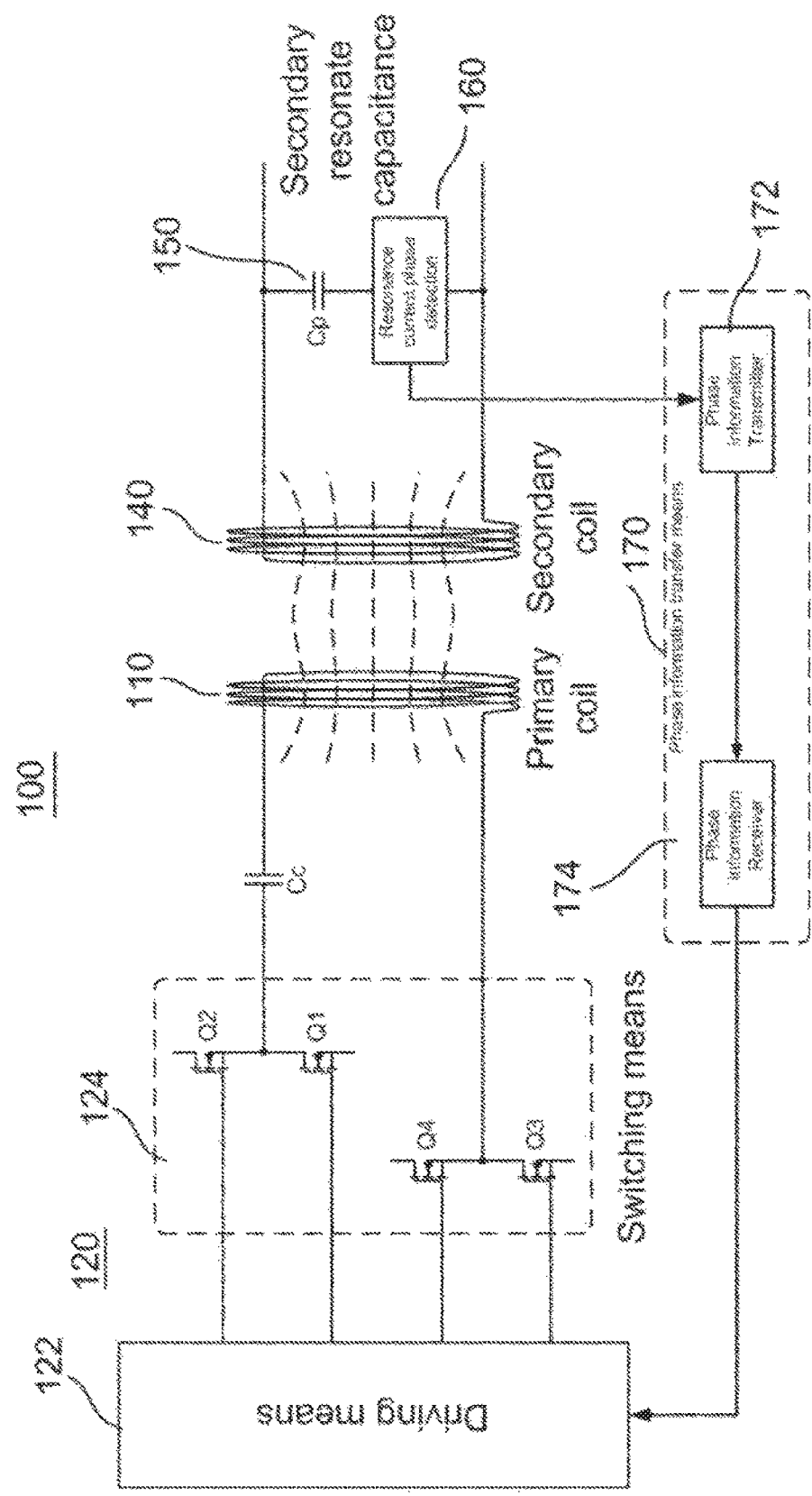
FIG. 1 is a block diagram showing a configuration of a main part of a wireless power transfer system according to the presently disclosed embodiment.

FIG. 1 is a block diagram showing a configuration of a main part of one aspect of a wireless power transfer system 100 according to the presently disclosed embodiment.

The primary side includes a primary coil (Primary coil) 110 and a driving circuit 120 connected to the primary coil 110 via a capacitor Cc. The driving circuit 120 includes a driving means (Driving means) 122 and a switching means (Switching means) 124. The switching means 124 is formed as a bridge circuit including transistor elements Q1 to Q4.

The secondary side includes a secondary coil (Secondary coil) 140 disposed so as to be isolated from the primary coil 110 with a coupling coefficient k, a resonance capacitor (Cp) 150 connected to the secondary coil 140 to form a resonance circuit, and a resonance current phase detection means (Resonance current phase detection means) 160 configured to detect phase information of a resonance current flowing through the resonance capacitor (Cp) 150. In the presently disclosed embodiment, a phase information transfer means 170 configured to transfer the phase information detected by the resonance current phase detection means 160 to the driving circuit 120 without phase delay is provided and the driving circuit 120 determines a driving frequency based on this phase information and drives the primary coil 110. The phase information transfer means 170 includes a phase information transmission means (Phase information Transmitter) 172 and a phase information reception means (Phase information Receiver) 174.

The secondary side is connected to a load not shown.

In the presently disclosed embodiment, only the resonance circuit that is formed by connecting the resonance capacitor (Cp) 150 to the secondary coil 140 is essential, and sufficiently efficient power transmission can be achieved without providing a series resonance capacitor to the primary coil 110.

The capacitor Cc shown in FIG. 1 is provided for the purpose of merely blocking a direct current, but is not provided as a resonance capacitor.

More specifically, primary-side resonance may be provided as a means for improving the presently disclosed embodiment, which, however, is optional but not essential in the presently disclosed embodiment.

If the driving timing of the switching means 124 can be precisely controlled so that the balance of currents that flow through the respective transistor elements Q1 to Q4 can be maintained, the capacitor Cc may be omitted.

In the presently disclosed embodiment, phase information of a resonance current flowing in the resonance circuit formed by the secondary coil 140 and the resonance capacitor (Cp) 150 connected in parallel or in series to the secondary coil 140 is detected by the resonance current phase detection means 160, then the phase information is sent from the phase information transmission means 172 on the secondary side to the phase information reception means 174 on the primary side, then the driving timing of the driving means 122 is determined based on the phase information.

In the presently disclosed embodiment, since no resonance circuit is provided on the primary side, the number of windings of the primary coil 110 differs compared to the conventional magnetic field resonance type that requires a primary-side resonance circuit.

While the phase information transfer means 170 transfers phase information detected by the resonance current phase detection means 160 "without phase delay", a phase delay inevitably exists in any detection means or transfer means and, therefore, "without phase delay" herein means to minimize a phase delay as much as possible and it is satisfactory if the primary-side driving means and the secondary side can share an absolute time.

Next, the respective components shown in the block diagram of FIG. 1 will be described.

Based on phase information transferred from the phase information transfer means 170, the driving means 122 determines a driving frequency so that the current phase of a driving current flowing in the primary coil 110 slightly delays from the voltage phase of a driving voltage applied to the primary coil 110, thereby driving the switching means 124. Detailed operation thereof will be described later.

The switching means 124 is formed by switching elements (Q1 to Q4) such as two or four transistors and drives the primary coil 110 via the DC blocking capacitor Cc.

Figure 2:
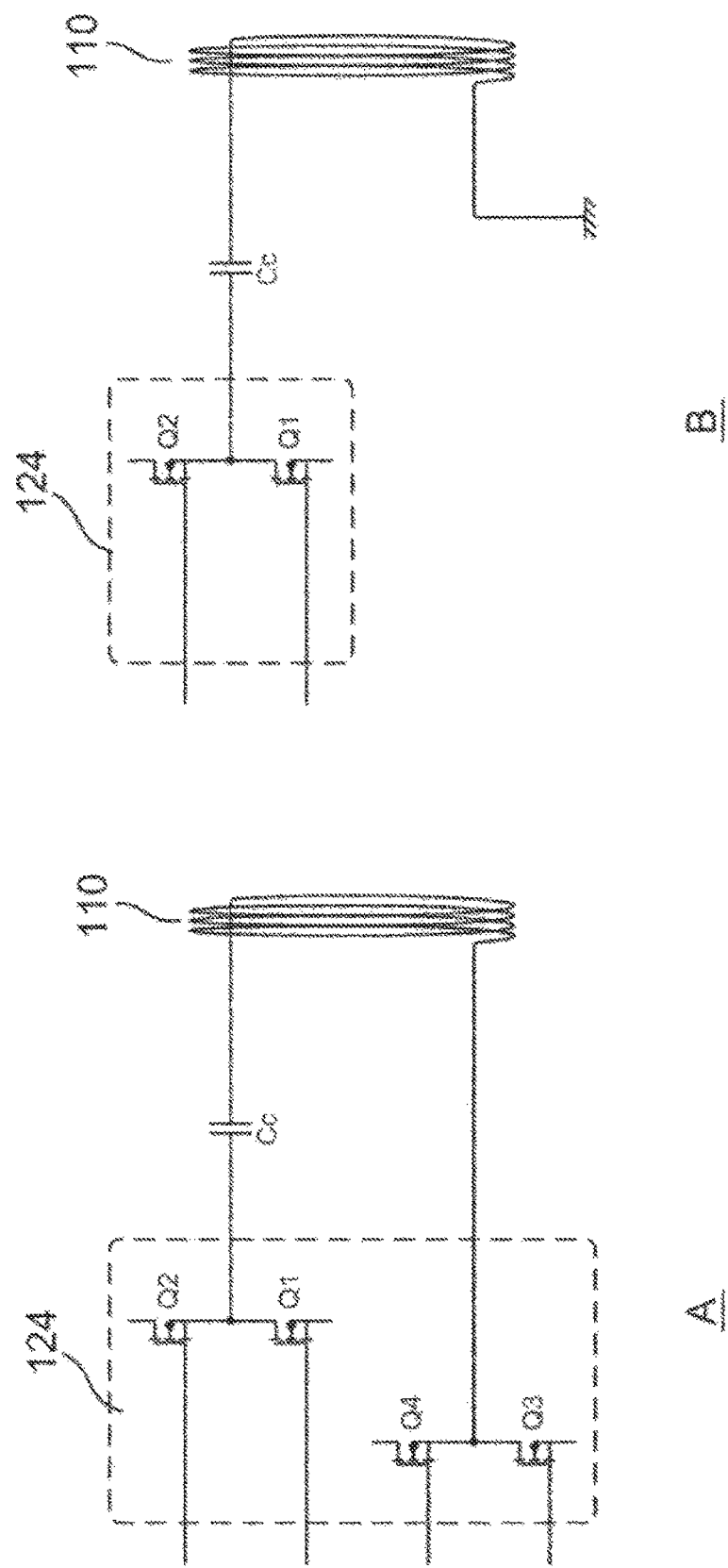
FIG. 2 is a circuit diagram showing examples of a switching means for use in the presently disclosed embodiment.

FIG. 2 is a circuit diagram showing examples of the switching means 124, wherein A shows a full-bridge circuit and B shows a half-bridge circuit. In the presently disclosed embodiment, the switching means 124 may be formed by the full-bridge circuit or the half-bridge circuit.

In the conventional wireless power transfer, the phase relationship between a driving voltage applied to the primary coil 110 and a driving current flowing in the primary coil 110, as seen from the switching means 124, largely changes depending on a driving frequency, and therefore, it has been difficult to maintain ZVS under various conditions and thus to prevent hard switching. Accordingly, a full-bridge circuit has been preferably employed for the reason that abnormal voltage is difficult to occur even at the occurrence of hard switching.

In the presently disclosed embodiment, a half-bridge circuit, which is conventionally said to be difficult to employ due to the occurrence of hard switching, can be safely employed. This is because, in the presently disclosed embodiment, it is possible to maintain ZVS under various conditions. Details will be described later. A full-bridge circuit is advantageous only in its high power utilization efficiency and is not an essential condition in the presently disclosed embodiment. Hereinbelow, a description will be given of the case where the full-bridge circuit is used as the switching means 124.

Figure 3:
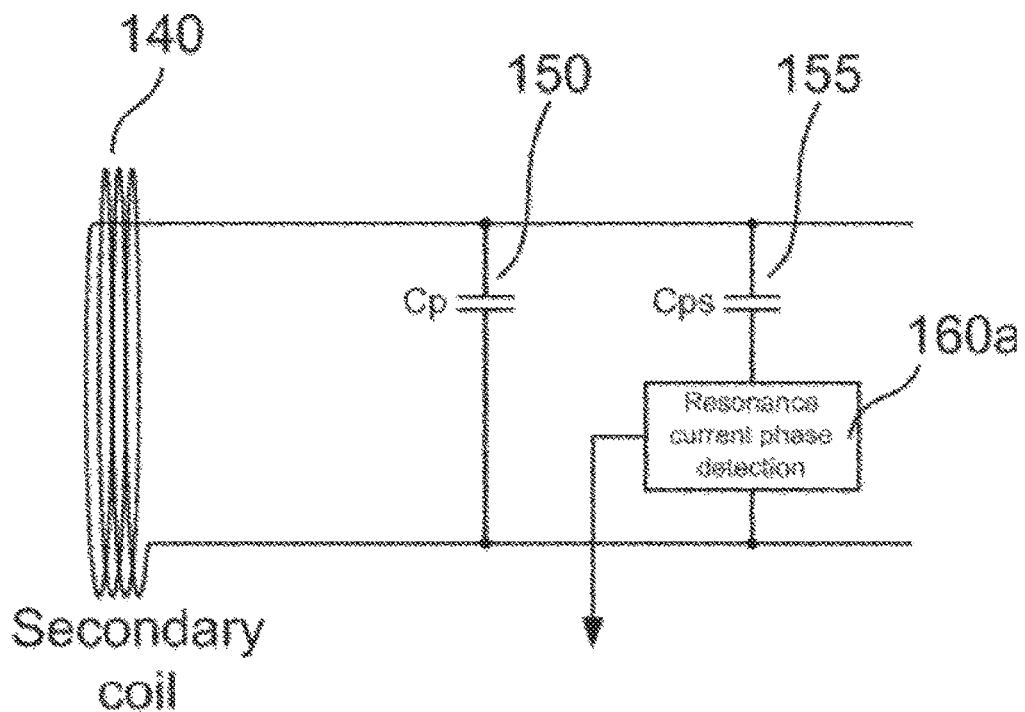
FIG. 3 is a diagram showing a configuration of a detecting portion including a resonance current phase detection means according to the presently disclosed embodiment.

FIG. 3 is a diagram showing a configuration of a detecting portion including the resonance current phase detection means 160 according to the presently disclosed embodiment.

The resonance capacitor (Cp) 150 and a small-capacity capacitor (Cps) 155 are connected in parallel to the secondary coil 140.

The resonance current phase detection means 160 may be configured to directly detect phase information of a current flowing through the resonance capacitor (Cp) 150 as shown in FIG. 1 or may be configured (160a) to detect phase information of a current flowing through the parallelly connected small-capacity capacitor (Cps) 155 as shown in FIG. 3. This is because since a voltage applied to the resonance capacitor (Cp) 150 and a voltage applied to the small-capacity capacitor (Cps) 155 connected in parallel thereto are the same, phase information of currents flowing through the respective capacitors are the same. In many cases, the current that flows through the resonance capacitor (Cp) 150 is very large and, therefore, if this current is directly detected, the resonance current phase detection means 160 should be formed by large-capacity parts, while, if the current flowing through the small-capacity capacitor (Cps) is detected, the resonance current phase detection means 160 can be formed by small-capacity parts.

The phase information of the resonance current detected by the resonance current phase detection means 160 is transferred to the primary-side driving circuit 120 by the resonance current phase transfer means 170.

As a configuration of the resonance current phase transfer means 170, various configurations can be considered. It may be optical coupling using a LED and a phototransistor, phase information may be transferred by modulating a magnetic circuit by a digitized signal of the phase information, or it may be a wireless means using a high-frequency carrier electromagnetic wave. If the phototransistor is used as a light receiving portion, a delay due to stored electric charge is large and, therefore, a means that uses the phototransistor by saturating it is not preferable. Accordingly, the unsaturated operation is preferable for the phototransistor and the constant voltage operation for suppressing the mirror effect is further preferable. More preferably, a pin photodiode may be used and further it may be used by applying a reverse bias thereto, thereby achieving high-speed operation.

Figure 4:
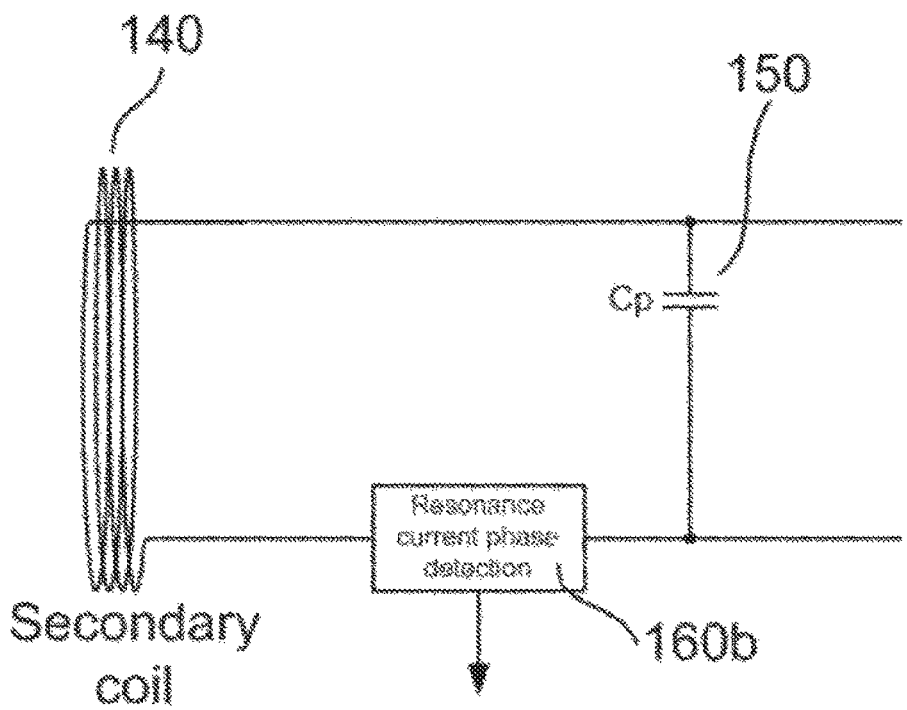
FIG. 4 is a diagram showing another example of the resonance current phase detection means according to the presently disclosed embodiment.

As shown in FIG. 4, the resonance current phase detection means 160 may be configured (160*b*) to detect a current flowing in the secondary coil 140. In this case, however, a phase component of a current flowing through a load is also included and combined in detected phase information. Since the phase component of the current flowing through the load delays by 90 degrees from a resonance current phase, these vectors are combined so that some phase delay occurs in the phase information. When the primary coil 110 is driven based on this phase information, ZVS operation is not achieved so that hard switching tends to occur.

When the hard switching occurs, high-frequency parasitic oscillation occurs in the elements (Q1 to Q4) of the switching means 124. In this case, EMI (Electro-Magnetic Interference), particularly noise power/noise electric field strength (radiation), increases. Therefore, a countermeasure is required, which will be described later.

Figure 5:
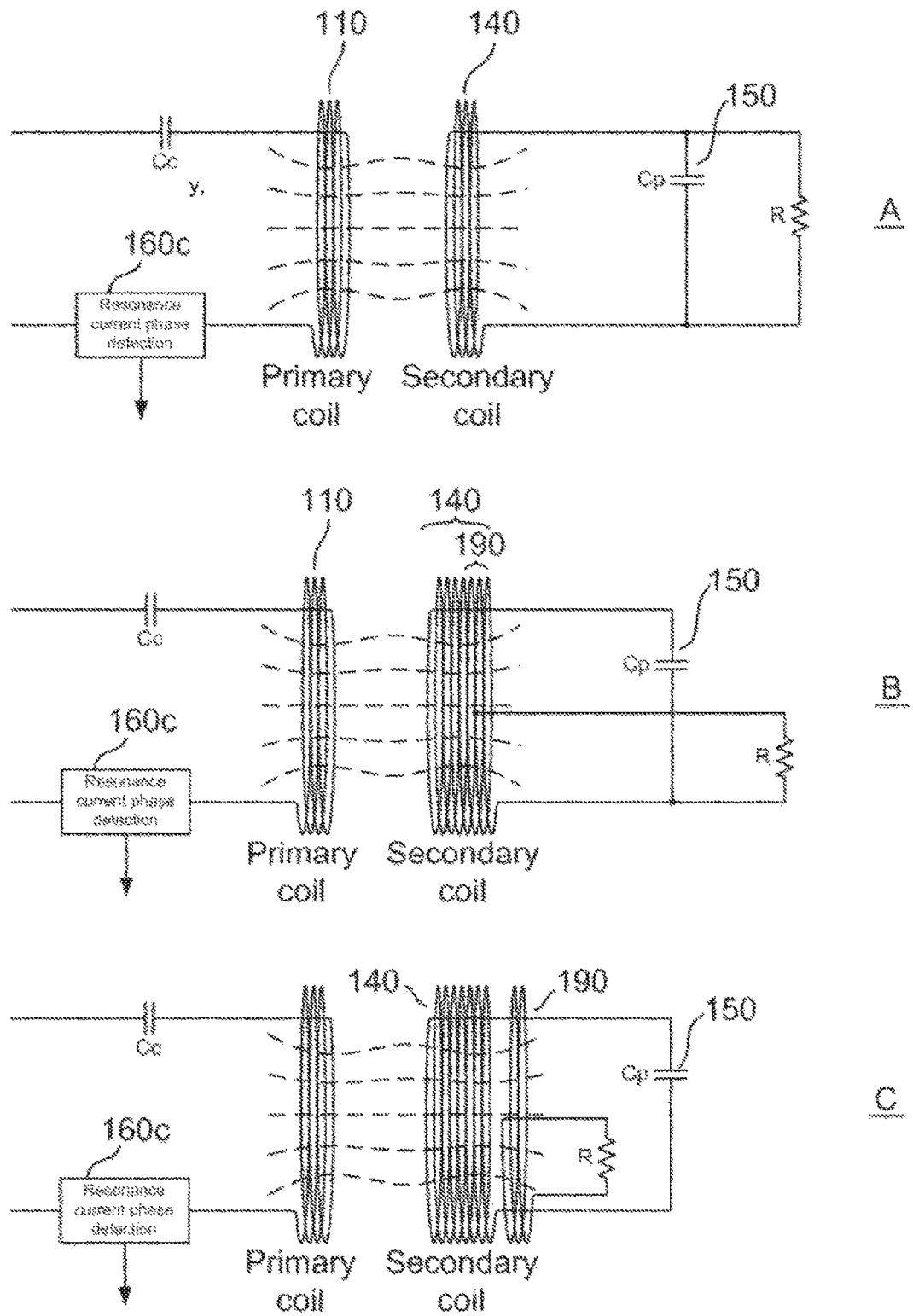
FIG. 5 is a diagram showing still another example of the resonance current phase detection means according to the presently disclosed embodiment.

As shown in FIG. 5, the resonance current phase detection means 160 may be configured (160*c*) to detect a current flowing in the primary coil 110. A shows a type in which power is extracted to a load R from the secondary coil 140, B shows a type in which the secondary coil includes a third coil 190 as an autotransformer and power is extracted to a load R from the third coil 190, and C shows a type in which power is extracted to a load R from a third coil 190 provided as an independent coil close to the secondary coil 140. The types B and C in which the third coil 190 is provided on the secondary side will be described in detail later. In these cases, hard switching often occurs so that phase correction is separately required, which will be described later.

There is a case where distortion is generated in a detected resonance current to cause a delay of resonance current phase information. Such distortion makes the resonance current phase information lack accuracy so that the driving timing of the primary coil 110 becomes inaccurate and that the peak of the resonance frequency cannot be correctly detected.

Figure 6:
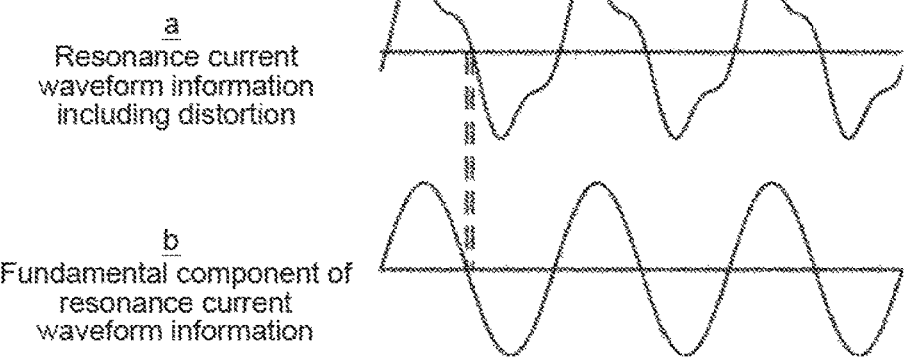
FIG. 6 is a diagram for explaining that phase information becomes inaccurate due to distortion included in a resonance current phase waveform.

FIG. 6 shows an example in which a third harmonic wave is included in a resonance current, and is an explanatory diagram for explaining that phase information becomes inaccurate due to this distortion. In such a case, by extracting only a fundamental component by an appropriate filter means and setting it as resonance current phase information, it is possible to enhance the accuracy of the phase information. Alternatively, it is possible to use only phase information of a fundamental wave by digitally series-expanding the resonance current.

Figure 7:
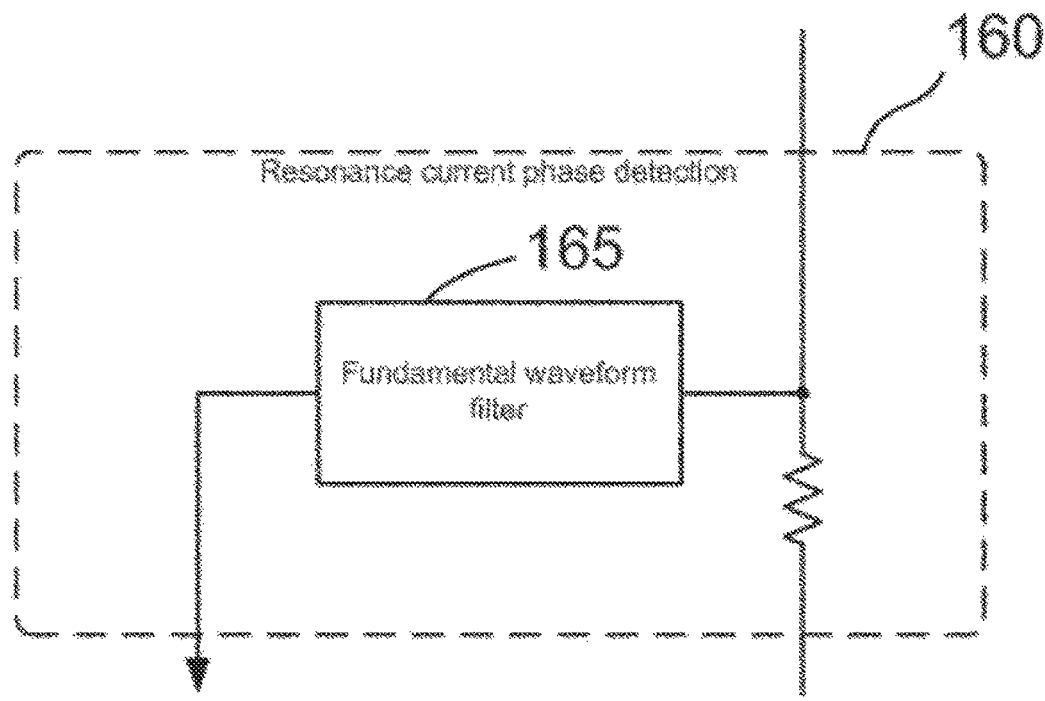
FIG. 7 is a conceptual diagram showing that harmonic distortion is removed from a resonance current phase waveform.

FIG. 7 is a conceptual diagram showing that harmonic distortion is removed from a resonance current phase waveform by providing the resonance current phase detection means 160 with a filter (Fundamental waveform filter) 165 configured to extract only a fundamental wave.

Next, a description will be given of setting a Q value of the secondary-side resonance circuit, which is important in the presently disclosed embodiment.

The wireless power transfer largely differs from power feeding by a general leakage transformer. In the case of the power feeding by the leakage transformer, a coupling coefficient (k) between a primary coil and a secondary coil is almost constant under all driving conditions, while a coupling coefficient (k) largely changes in the wireless power transfer. In the conventional power feeding by the leakage transformer, a Q value of a secondary-side resonance circuit does not need to be set so high.

On the other hand, in the case of the wireless power transfer, since the coupling coefficient (k) changes, a high Q value is necessary when the coupling coefficient (k) is small.

When the Q value is low, it is difficult to keep the power factor of the primary coil good in the case where the conditions in use are largely changed. On the other hand, when the Q value is too high, likewise in the case where the conditions in use are largely changed, it is difficult to satisfy the condition that a driving frequency is determined so that the current phase of a driving current flowing in the primary coil slightly delays from the voltage phase of a driving voltage applied to the primary coil, thereby driving the primary coil (i.e. the ZVS operation condition).

In the presently disclosed embodiment, a high Q value is required for increasing the robustness. However, as the Q value becomes higher, the full width half maximum becomes much narrower so that even a slight frequency error causes a problem. Therefore, a phase delay (or a time delay) in the resonance current phase information transfer means should be minimized as much as possible. When a delay in the resonance current phase information transfer means has occurred, the following occurs.

Figure 8:
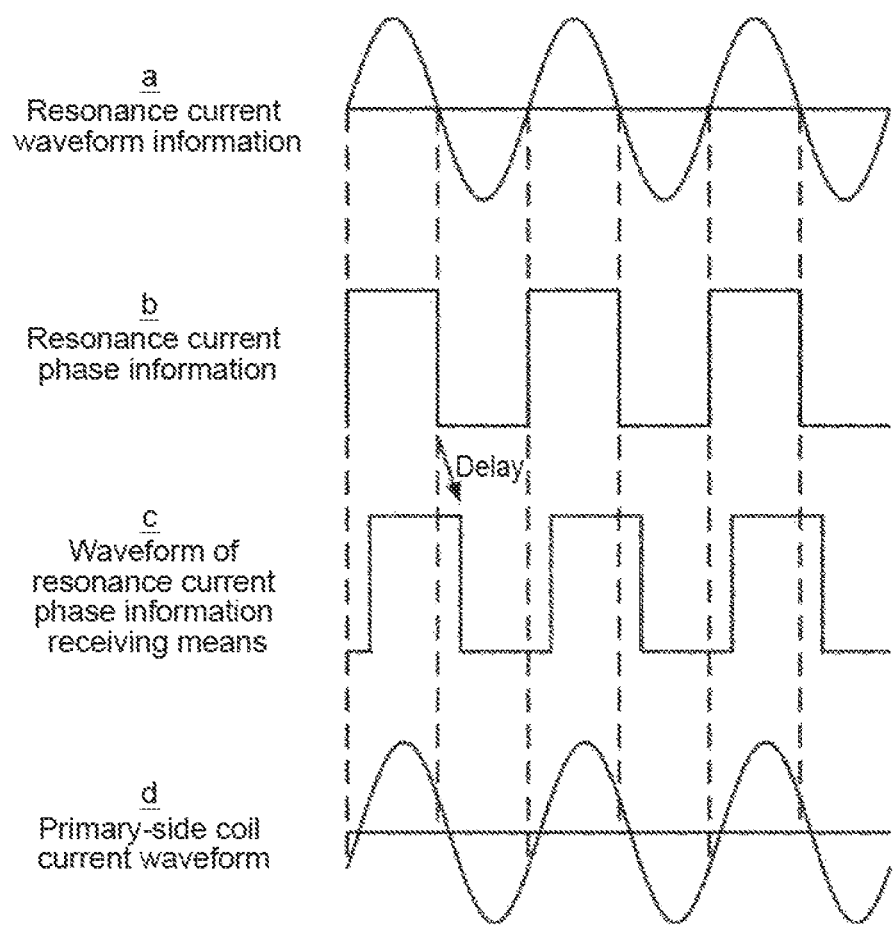
FIG. 8 is a conceptual diagram showing changes of various waveforms when a phase delay has occurred in resonance current phase information.

FIG. 8 is a conceptual diagram showing changes of various waveforms when a phase delay has occurred in resonance current phase information.

a is a waveform of a resonance current of the resonance circuit, b is a waveform of phase information detected by the resonance current phase detection means 160, c is a waveform of phase information output from the phase information reception means 174, and d is a waveform of a current flowing in the primary coil 110. The waveform c output from the phase information reception means 174 is delayed from the waveform b and becomes a driving waveform for the switching means 124 almost as it is.

Figure 9:
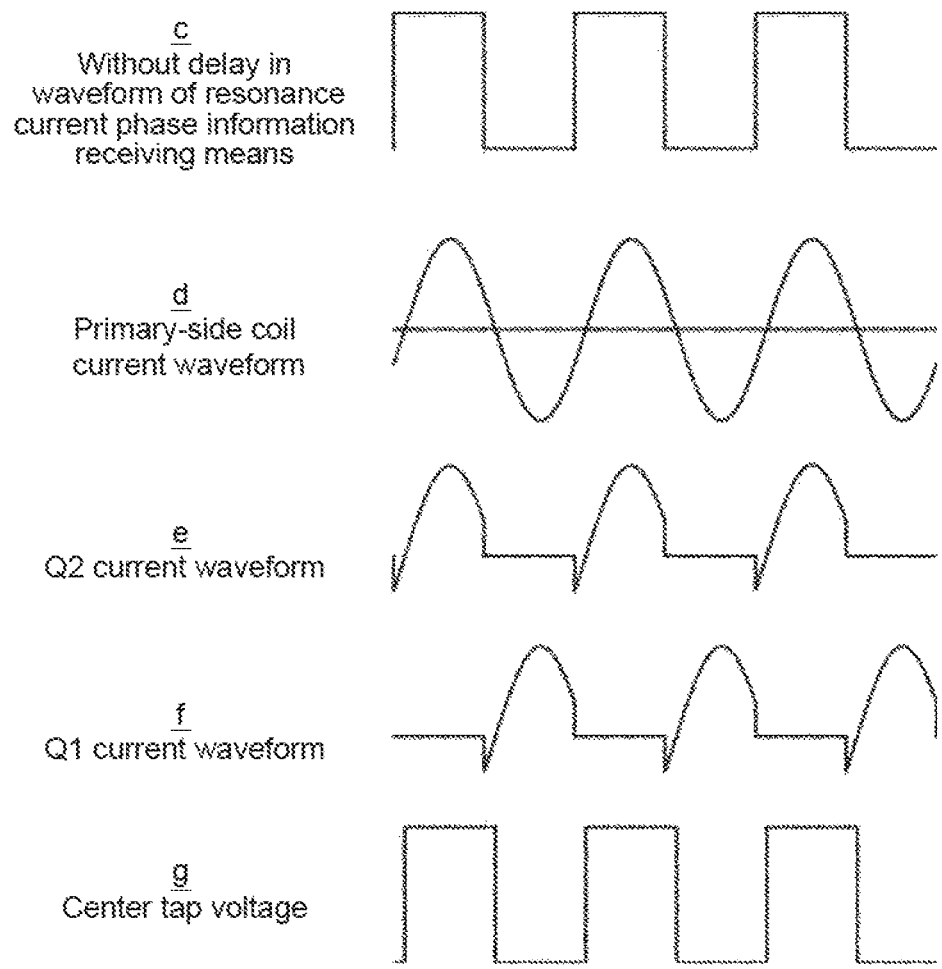
FIG. 9 is a diagram showing waveforms of currents flowing in the switching means where ZVS operation is performed in the case where a phase delay of resonance current phase information is small.

FIG. 9 is a diagram showing waveforms of currents flowing in the switching means 124 where ZVS operation is performed in the case where a phase delay of resonance current phase information is small.

When no delay or an extremely small delay exists in a waveform of the phase information reception means 174 (*c*), since the timing of a current flowing in the primary coil 110 is slightly advanced compared to the switching timing of the switching means 124 (*d*), current waveforms of the switching elements Q1 and Q2 (*e, f*) of the switching means 124 achieve ZVS operation. In this case, the center tap voltage of the switching means 124 becomes a complete square wave (g).

Figure 10:
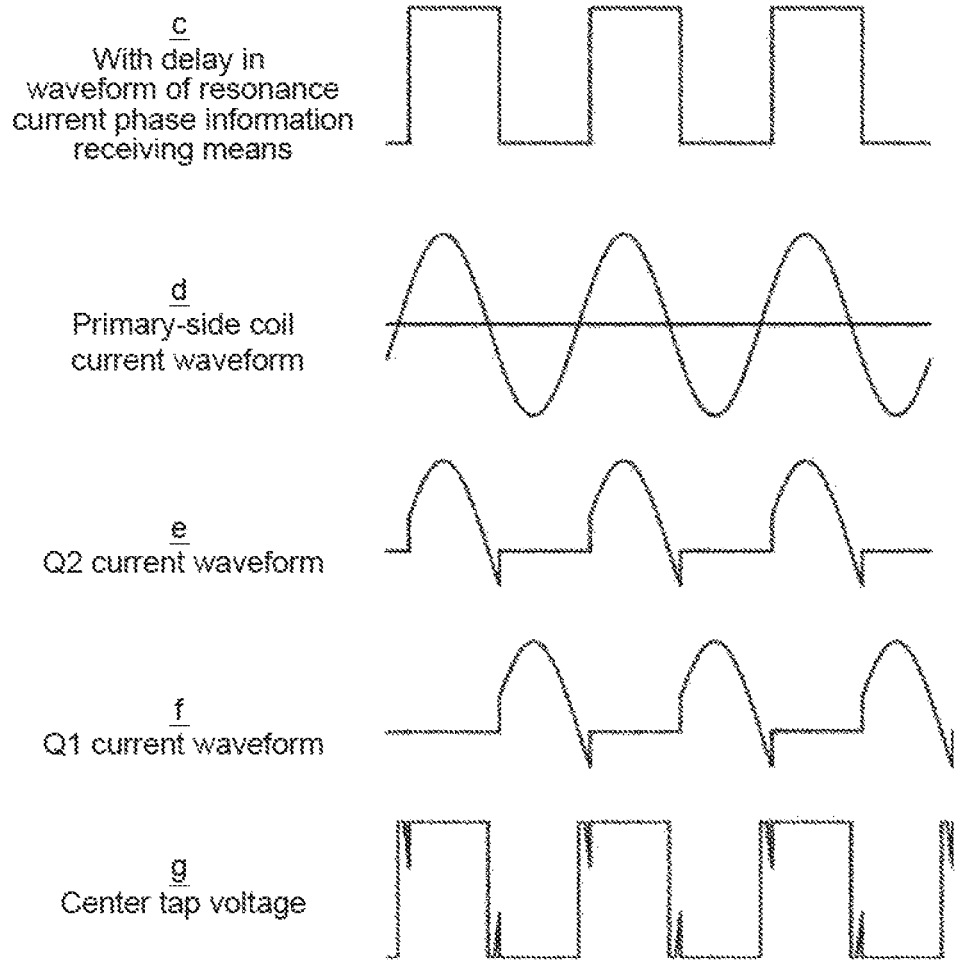
FIG. 10 is a diagram showing waveforms of currents flowing in the switching means where ZVS operation is not performed in the case where a phase delay of resonance current phase information is large.

On the other hand, FIG. 10 is a diagram showing waveforms of currents flowing in the switching means 124 where ZVS operation is not performed in the case where a phase delay of resonance current phase information is large.

Since the timing of a current flowing in the primary coil 110 is delayed compared to the switching timing of the switching means 124 (*d*), current waveforms of the switching elements Q1 and Q2 (*e, f*) do not achieve ZVS operation so that a unique pulse waveform due to rebound is generated in the center tap voltage of the switching means 124 (g). The generation of this rebound waveform may break the switching elements Q1 and Q2 and the driving means 122 and may cause the occurrence of EMI.

From the above, in the presently disclosed embodiment, a phase delay in the phase information transfer means 170 should be minimized as much as possible. When a phase delay cannot be avoided, the following phase correction means is used.

Figure 11:
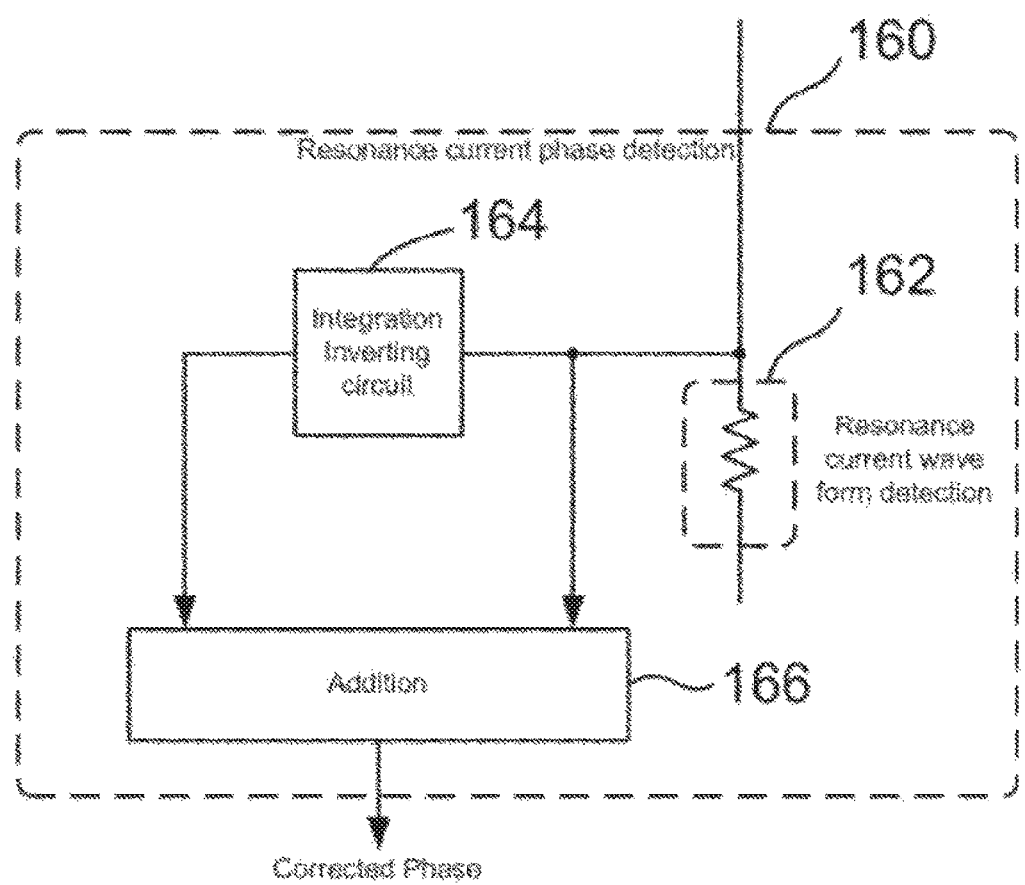
FIG. 11 is a diagram showing one example of a circuit configured to correct the phase of resonance current phase information.

FIG. 11 is a diagram showing one example of a circuit configured to correct the phase of resonance current phase information.

A resonance current waveform detection circuit 162, an integration inverting circuit 164 configured to invert and integrate or to integrate and invert a waveform of a detected resonance current, and an adding circuit 166 configured to superimpose and combine an output from the resonance current waveform detection circuit 162 and an output from the integration inverting circuit 164 are provided in the resonance current phase detection means 160. The phase of an inverted integrated waveform is advanced by 90 degrees compared to that of the waveform of the original resonance current. Accordingly, by detecting resonance current phase information based on a waveform obtained by superimposing and combining the waveform of the original resonance current and its inverted integrated waveform in a proper ratio, it is possible to obtain resonance current phase information corrected in a phase advancing direction. Then, this is sent to the phase information reception means 174 via the phase information transmission means 172.

Figure 12A:
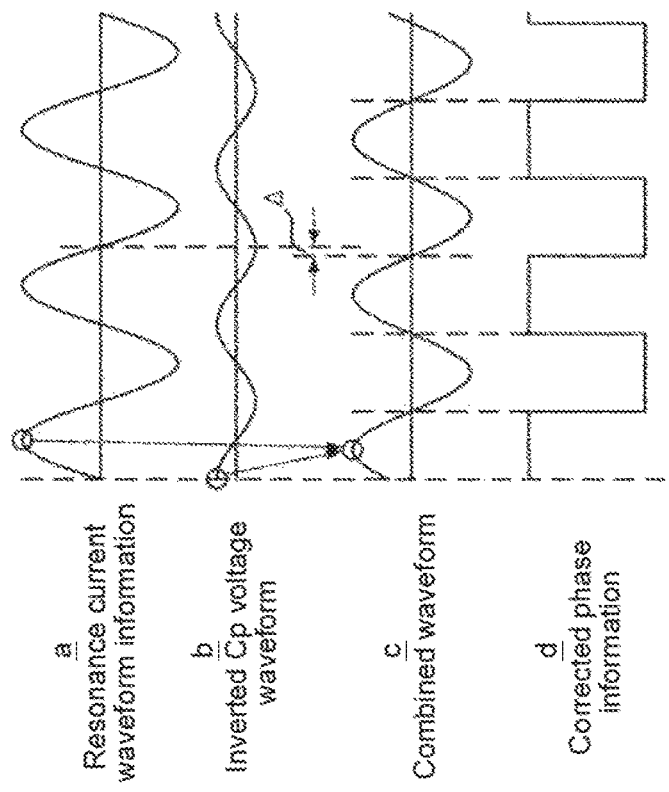
FIGS. 12A, B are diagrams for explaining the correction of the phase information.
Figure 12B:
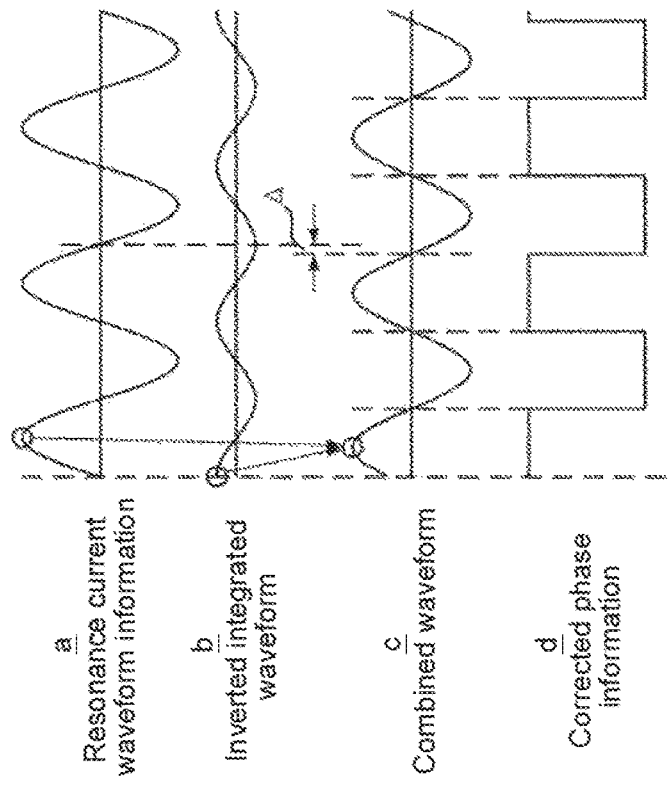

FIGS. 12A and 12B are diagrams for explaining the phase information correction described above.

a is original resonance current waveform information and b is its inverted integrated waveform. c is a combined waveform obtained by superimposing and combining a and b. Phase information d corrected by the combined waveform in a phase advancing direction is a waveform that transfers the original resonance current waveform information a without delay.

The integration inverting circuit 164 may be formed by using an operational amplifier or may be configured to perform inversion by using a transformer and then to perform integration by using a capacitor (C) and a resistor (R).

Figure 13:
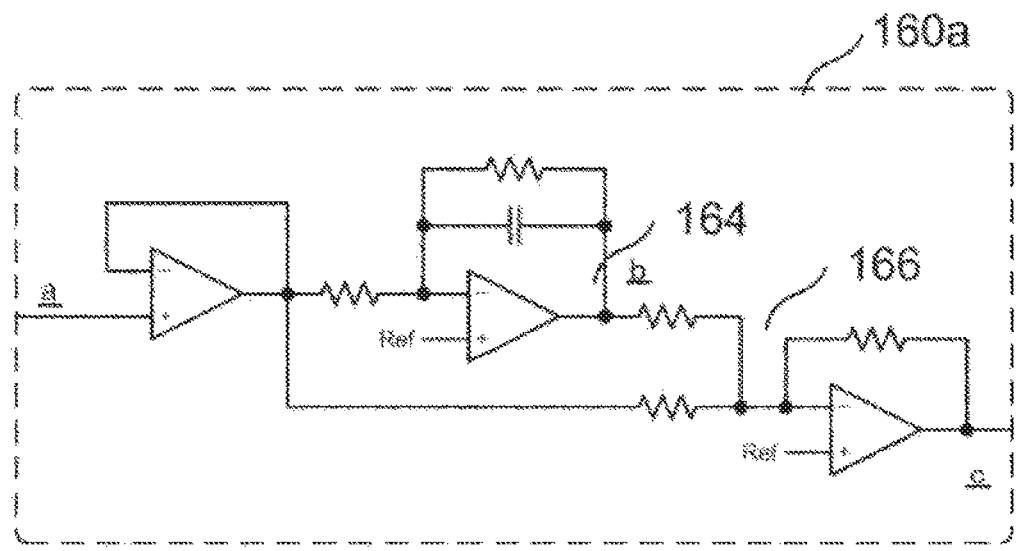
FIG. 13 is a specific circuit diagram for performing the phase correction.

FIG. 13 is a diagram showing a specific circuit diagram of the resonance current phase detection means 160*a* for performing the phase correction.

The phase of resonance current waveform information a is advanced by being inverted and integrated by an integration inverting circuit 164 via a buffer amplifier and then being combined by a combining circuit 166, thereby obtaining a corrected waveform c (see FIG. 12A).

Figure 14:
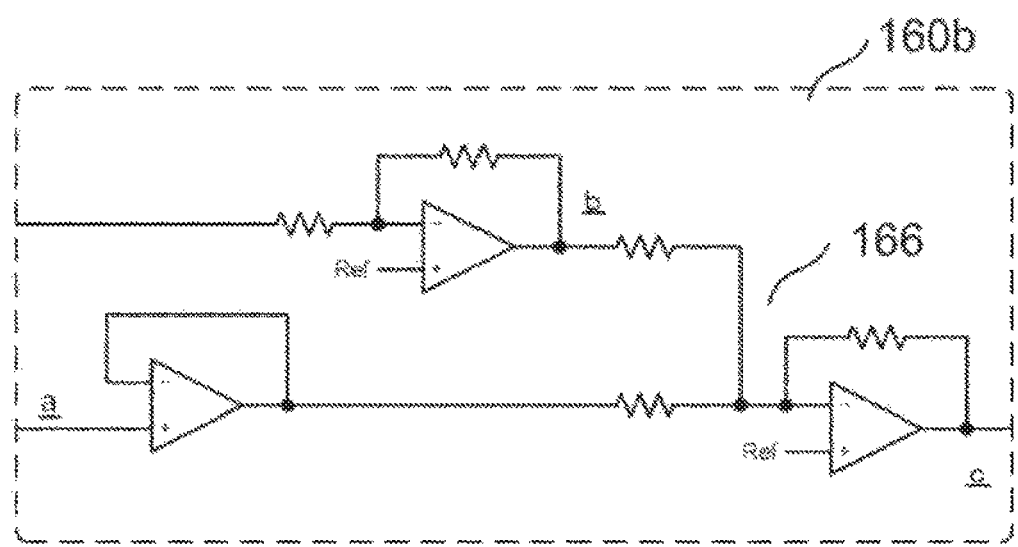
FIG. 14 is another specific circuit diagram for performing the phase correction.

FIG. 14 is a diagram showing another specific circuit diagram of the resonance current phase detection means 160*b*, wherein, paying attention to the fact that the voltage at both ends of the resonance capacitor Cp 150 has an integrated waveform with respect to a resonance current waveform, this voltage is properly divided and inverted, thereby performing phase correction.

The phase of resonance current waveform information a is advanced by being combined with the inverted resonance capacitor voltage by a combining circuit 166, thereby obtaining a corrected waveform c (see FIG. 12B).

Figure 15:
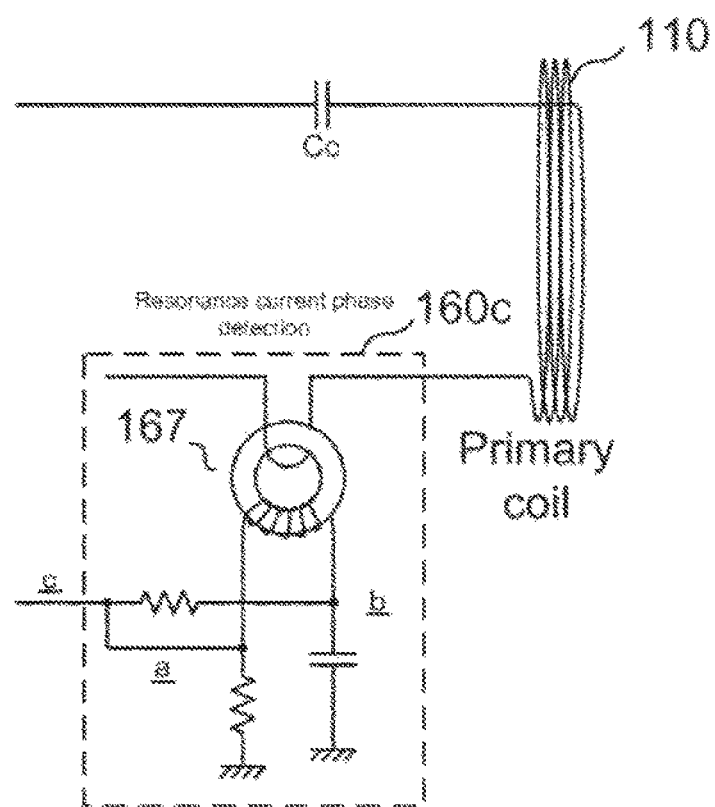
FIG. 15 is still another specific circuit diagram for performing the phase correction.

FIG. 15 is a diagram showing still another specific circuit diagram of the resonance current phase detection means 160*c*. In this example, a resonance current waveform detected from the primary coil 110 via a current transformer 167 and its inverted integrated waveform are combined, thereby performing phase correction. A resonance current phase waveform detected on the primary side is a and an inverted integrated resonance current phase waveform is b, wherein a corrected waveform c is obtained by combining them.

It is also possible to use a differentiated, rather than integrated, waveform without inversion, which is included in the meaning of inversion and integration as a proper design matter in the presently disclosed embodiment. However, in many cases, harmonic components are emphasized and superimposed on a differentiated waveform and, therefore, it can be said that it is preferable compared to the case where an integrated waveform is used. The phase correction means may properly combine the respective resonance current phase waveforms a and their inverted integrated waveforms b of 160*a*, 160*b*, and 160*c*, or may be such that the respective circuits of the current detection means 160*a* and 160*b* are replaced with each other.

The description has been given above of the case where resonance current waveform information and resonance current phase information are processed in an analog manner. However, the phase transfer means in the presently disclosed embodiment aims to achieve that the primary-side driving means and the secondary side share an absolute time, and the phase correction means in the presently disclosed embodiment is satisfactory if a phase-advanced corrected waveform is resultantly obtained based on a waveform including resonance current phase information.

If an absolute time can be shared by some means, it is possible to obtain corrected phase information based on a difference from the absolute time and thus to obtain a corrected phase waveform. That is, it is needless to say that digital processing is enabled based on the knowledge described above.

Next, a description will be given of setting a Q value of the resonance circuit formed on the secondary side, which is important in the presently disclosed embodiment.

As described earlier, in the case of the wireless power transfer, since the coupling coefficient (k) changes, a particularly large Q value is required when the coupling coefficient (k) is small. When the Q value is low, in the case where the conditions in use are largely changed, it is difficult to drive the primary coil while satisfying the condition that the current phase of a driving current flowing in the primary coil slightly delays from the voltage phase of a driving voltage applied to the primary coil.

In order to solve this, it is not preferable to fix a driving frequency (so-called fixed-frequency type or called a separate excitation type), while it is essential to control the driving circuit based on phase information of a resonance current flowing through the resonance capacitor of the secondary-side resonance circuit, a resonance current flowing in the secondary coil, or a resonance current reflected on the primary coil. As a result, there is no alternative but to make the driving frequency variable. It is described in JP2002-272134 that the driving frequency is changed depending on the resistance component of a load in the magnetic field resonance type wireless power transfer.

In the invention described in JP2002-272134, by detecting a load resistance, an optimal driving frequency is obtained by pre-programmed prediction information or calculation and a saturable inductor, thereby driving a driving means. However, according to this method, while the power factor as seen from a switching means of a driving circuit configured to drive a primary coil approaches 1, the power factor as seen from the primary coil does not approach 1, and therefore, while heat generation of the switching means is suppressed, the power factor as seen from the primary coil side is very poor and causes heat generation of the primary coil.

In the presently disclosed embodiment, in order to derive a condition for eliminating a resonance circuit on the primary coil side and causing the power factor as seen from the primary coil to approach 1, a Q value of the resonance circuit on the secondary coil side is set higher than normal.

Figure 16:
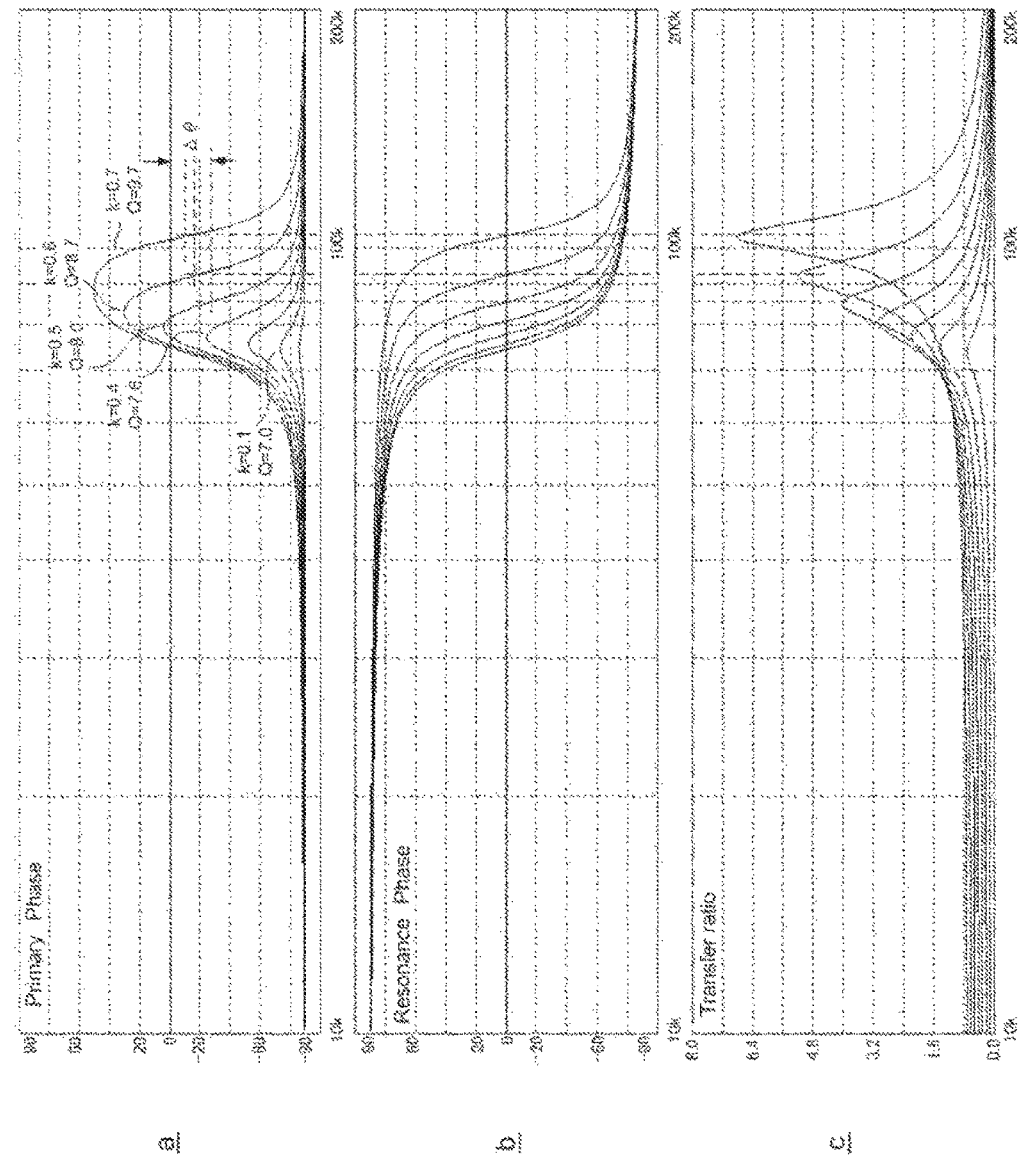
FIG. 16 is a diagram for explaining the relationship between the current phase of a resonance capacitor and the current phase of a primary coil.

FIG. 16 is a diagram for explaining the relationship between the current phase of the resonance capacitor connected to the secondary coil and the current phase of the primary coil, wherein Q values required when the coupling coefficient (k) is changed are obtained by simulation.

a shows the current phase of the primary coil, wherein the ordinate axis represents the phase angle and the abscissa axis represents the driving frequency. b shows the current phase of the secondary-side resonance capacitor, wherein the ordinate axis represents the phase angle and the abscissa axis represents the driving frequency. c shows the transfer ratio, wherein the ordinate axis represents the transfer ratio and the abscissa axis represents the driving frequency. A transfer ratio, when multiplied by a ratio between the number of windings of the primary coil and the number of windings of the secondary coil, generally shows a step-up ratio.

It is seen that when the coupling coefficient (k) is 0.5, the condition that the phase of a current flowing in the primary coil slightly delays from the phase of a driving voltage of the driving circuit configured to drive the primary coil is satisfied by setting the Q value to 8 or more. In the example of FIG. 16, when the coupling coefficient (k) is 0.5, a frequency at which the transfer ratio becomes maximum is 85 kHz. At this frequency, a delay angle Δθ of a current flowing in the primary coil is 25 degrees or less so that cos θ, i.e. the power factor, becomes 0.9 or more. Therefore, it can be said that 85 kHz is the optimal driving frequency.

At this optimal driving frequency, the phase of a resonance current flowing through the secondary-side resonance capacitor is 0 degrees. That is, if this resonance current phase information is transferred to the driving circuit via the phase information transfer means without phase delay to drive the driving circuit, the switching means can be driven automatically at the optimal driving frequency. Further, since this switching condition is also ZVS operation, even if the switching means has a half-bridge configuration, stable ZVS operation can be achieved.

As described above, according to the presently disclosed embodiment, the driving circuit is driven at a driving frequency determined based on phase information of a resonance current and automatically performs ZVS operation. However, since a high Q value is required in the wireless power transfer, if there is even a slight phase delay (or time delay), ZVS operation is not achieved so that phase correction is required.

Next, a description will be given of setting a target Q value.

A Q value of the resonance circuit is determined as follows, based on a leakage inductance (L) of the secondary coil, a capacitance (C) of the resonance capacitor, and an equivalent load resistance (R) on the secondary coil side.

$$Q = \frac{1}{R}\sqrt{\frac{L}{C}} = \frac{\omega L}{R} = \frac{1}{\omega CR} \text{ (series resonance circuit)}$$ [Formula 2]

$$Q = R\sqrt{\frac{C}{L}} = \frac{R}{\omega L} = \omega CR \text{ (parallel resonance circuit)}$$

In the presently disclosed embodiment, while either series connection or parallel connection may be used for connection between the secondary coil and the resonance capacitor, a description will be given below of an example of parallel connection. This is because the resonance providing the resonance capacitor in parallel to the secondary coil, which is one of the presently disclosed embodiment, becomes series resonance when seen from the driving side and parallel resonance when seen from the load side, which thus is a modified resonance circuit. This is called by various names such as Serial Parallel-Loaded Resonance. Parallel resonance is applied to a calculation of Q in this case. That is, in order to set the Q value to a predetermined high value, the capacitance C of the resonance capacitor is set large and the leakage inductance L of the secondary coil is set small compared to the equivalent load resistance R.

The definition of a leakage inductance $L_{sc}$ in the presently disclosed embodiment is determined by the following formula.

$$L_{sc}=L_2 \cdot (1-k^2)$$ [Formula 3]

where $L_2$ is an inductance of the secondary coil or an inductance of the independent third coil.

The leakage inductance is variously defined by industrial societies or academic societies in various countries and is not standardized, such as, for example, $$L_e=L_2 \cdot (1-k)$$ [Formula 4]

where $L_e$ is a leakage inductance.

In the presently disclosed embodiment, the resonance circuit formed on the secondary side by connecting the secondary coil and the resonance capacitor includes one of a configuration in which the resonance capacitor is connected in parallel to the secondary coil and a configuration in which the resonance capacitor is connected in series to the secondary coil. A configuration for extracting the power to a load from a third coil will be described later.

In the presently disclosed embodiment, a target Q value of the secondary-side resonance circuit is set to a value greater than or equal to a value satisfying $Q=2/k^2$ where k is a coupling coefficient.

Figure 17:
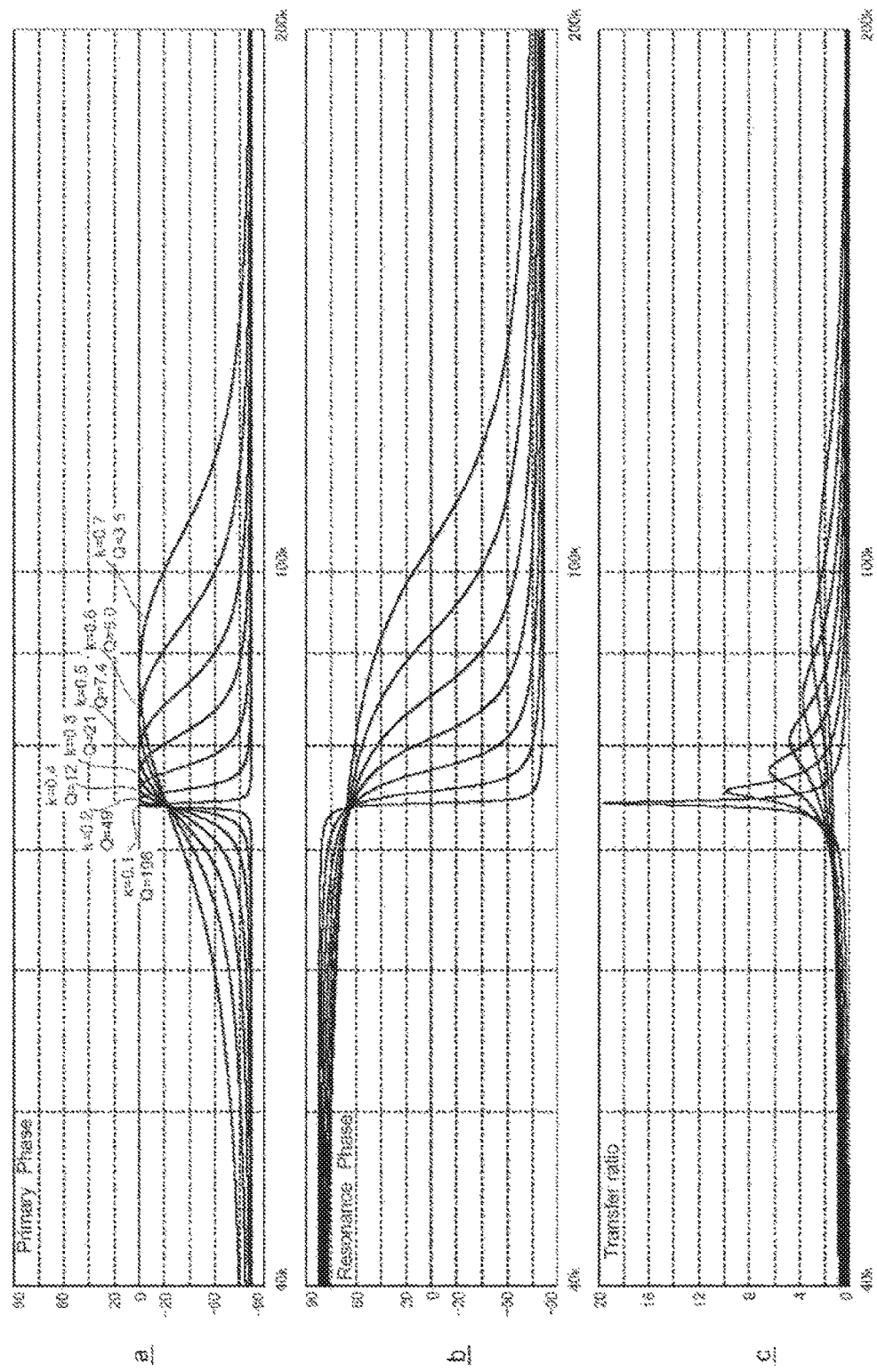
FIG. 17 is a diagram in which minimum Q values required for obtaining a power factor of 1 are derived.

FIG. 17 is a diagram in which minimum Q values required for obtaining the power factor as seen from the primary coil are derived by simulation. The abscissa axis represents the driving frequency. On the ordinate axis, a shows the current phase of the primary coil with respect to the switching voltage of the primary coil, b shows the resonance current phase of the secondary-side resonance capacitor, and c shows the transfer ratio (transfer coefficient).

Figure 18:
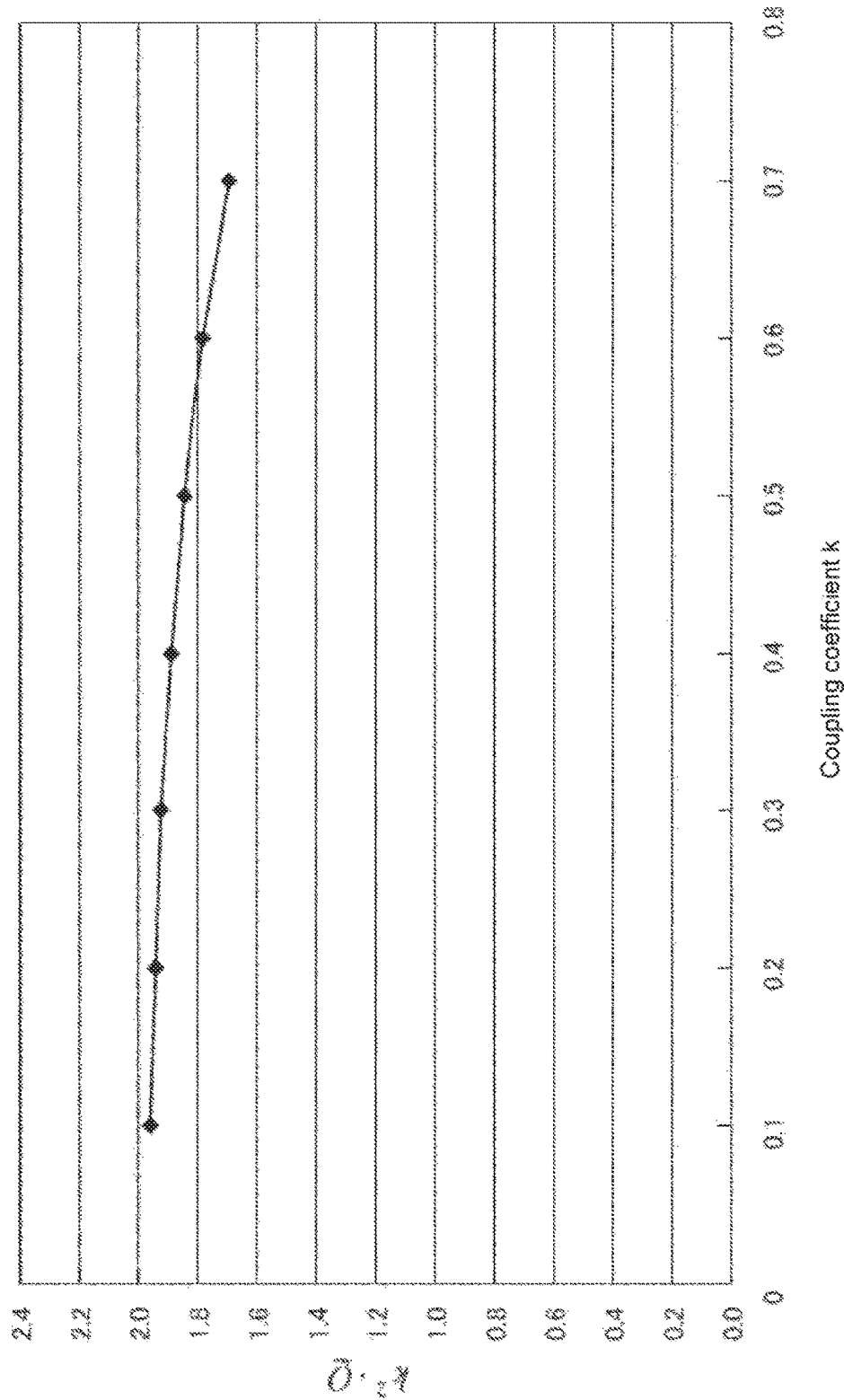
FIG. 18 is a diagram for explaining that a required minimum Q value gradually approaches $k^2Q=2$ as k decreases.

FIG. 18 is a diagram for explaining that the minimum Q value required for obtaining a power factor of 1 as seen from the primary coil gradually approaches a relationship of $k^2 \cdot Q=2$ as the coupling coefficient k decreases.

As is clear from FIG. 18, the value of $k^2 \cdot Q$ gradually approaches 2 as k decreases, but never exceeds 2. Accordingly, in the wireless power transfer, when the distance between the primary coil and the secondary coil is large so that the coupling coefficient k is sufficiently small, the Q value of the secondary-side resonance circuit for obtaining a power factor of 1 as seen from the primary coil satisfies $$k^2 \cdot Q=2$$ [Formula 5]

Herein, in consideration of the operation of detecting, from the primary coil, phase information of a resonance current flowing in the secondary-side resonance circuit, a current phase curve of the primary coil should cross an abscissa axis of 0 degrees and, in this case, the current phase curve should cross it so that the phase changes from plus, i.e. capacitive, to minus, i.e. inductive, as the driving frequency increases.

Accordingly, when the minimum Q value is set to a Q value exceeding [Equation 5], a current phase curve of the primary coil surely crosses an abscissa axis of 0 degrees. This is explained in FIG. 19.

Figure 19:
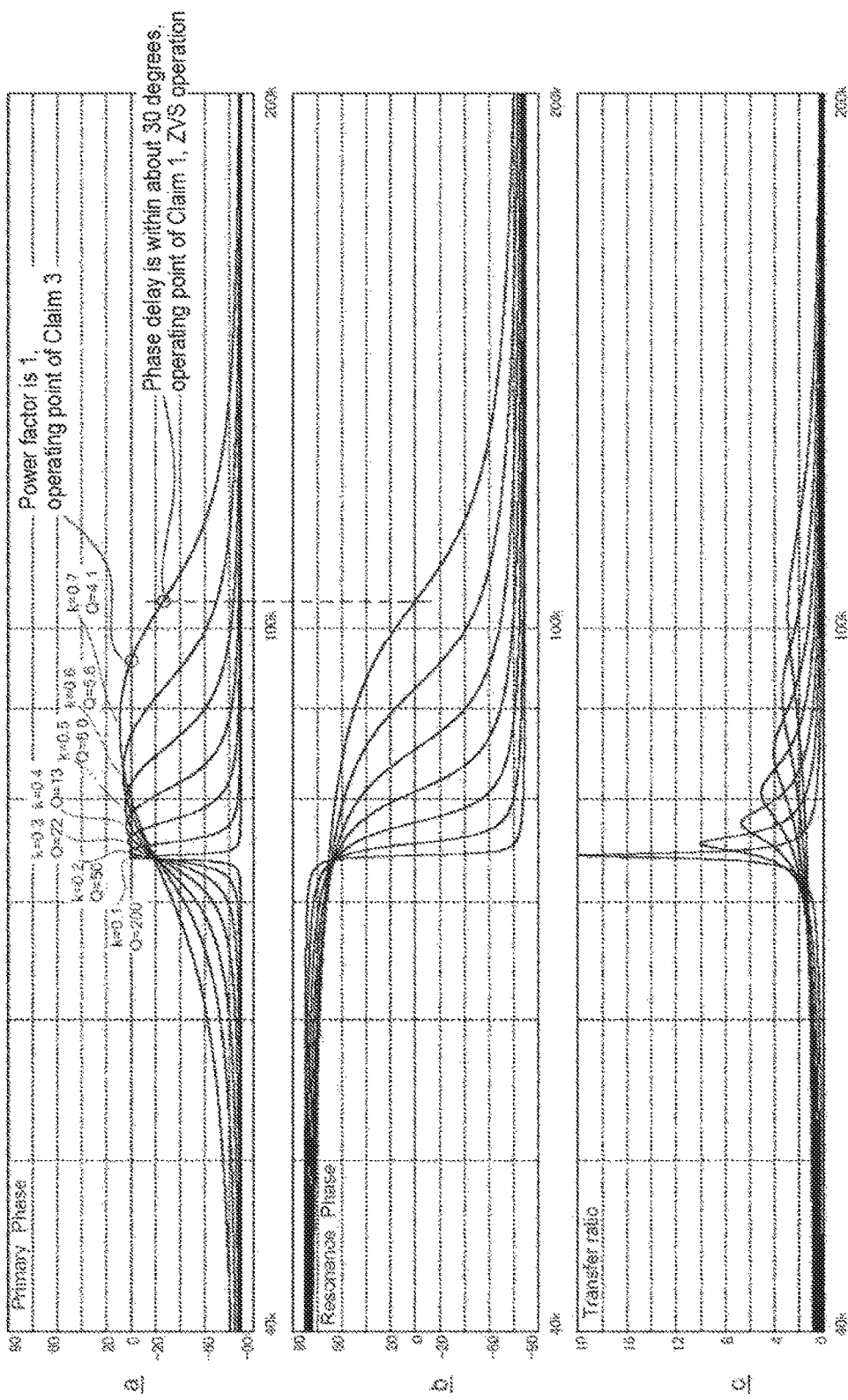
FIG. 19 is a diagram showing that when $Q=2/k^2$, a current phase curve of a primary coil crosses 0 degrees.

In FIG. 19, a, b, and c respectively correspond to those in FIG. 17. In FIG. 19, when coupling coefficient k=0.7, a current phase curve of the primary coil, as shown at a, crosses an abscissa axis of 0 degrees so that the phase changes from plus, i.e. capacitive, to minus, i.e. inductive, as the driving frequency increases.

While k=0.7 in the above description, the same description also applies to the case where k takes other values. Herein, when the power factor is set to just 1, hard switching occurs even when the current phase of the primary coil is slightly advanced. Therefore, the normal operating point is set to a point where the current phase of the primary coil is slightly inductive, i.e. slightly delayed. This is known as a ZVS operation condition.

In this case, the power factor is sufficiently satisfactory if the delay angle of the phase is in a range from 0 degrees to −30 degrees and therefore it can be said that the efficiency is quite excellent. When phase information of a resonance current flowing through the resonance capacitor is used, if there is no phase delay or time delay in this phase information, by driving the primary-side switching means in accordance with this phase information, even when the coupling coefficient is small, the system automatically operates at a ZVS operation point in the state where the Q value is high.

Next, the power control in the presently disclosed embodiment will be described.

In general, the power control is performed by changing the duty cycle of the switching means so as to be smaller than 50%.

Figure 20:
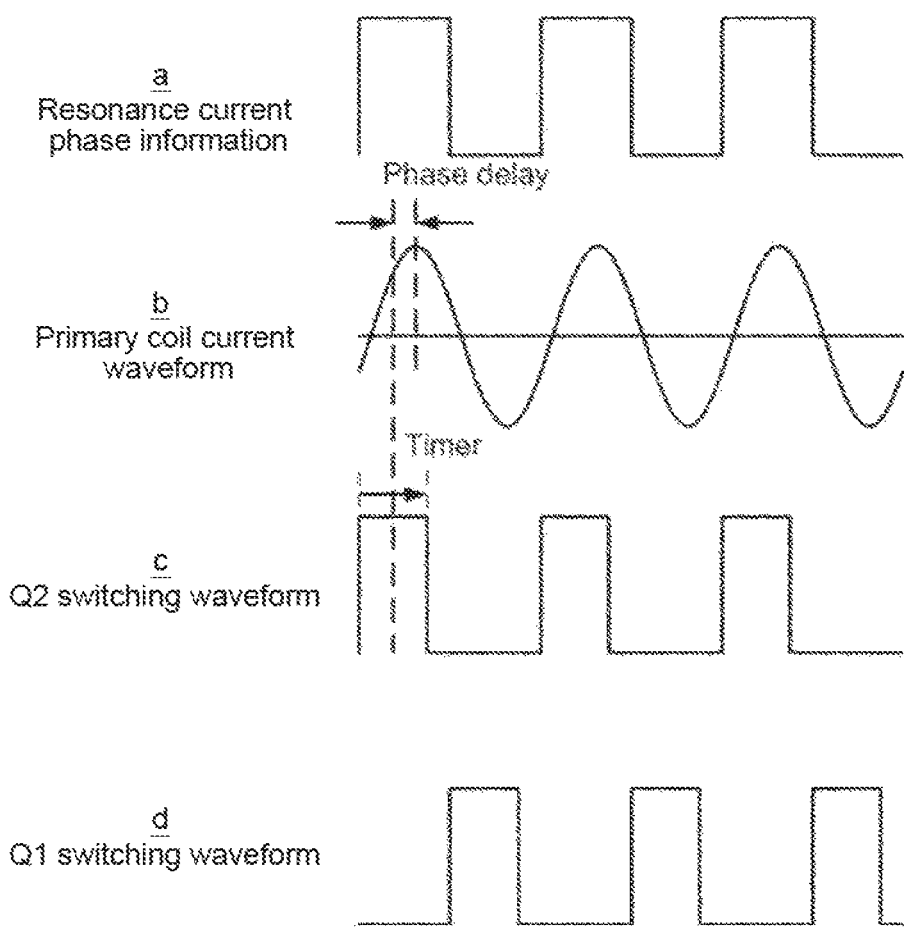
FIG. 20 is a diagram for explaining one example of the power control according to the presently disclosed embodiment.

FIG. 20 is a diagram for explaining one example of the power control according to the presently disclosed embodiment. a shows phase information of a resonance current, b shows a current waveform of the primary coil, and c and d show gate control voltages when the switching means (Q2, Q1) are FETs, IGBTs, or the like.

In the presently disclosed embodiment, the power control is performed by, based on phase information of a resonance current, turning on the switching means of the driving circuit configured to drive the primary coil and turning off the switching means after the lapse of a predetermined time. In this case, hard switching is generally concerned about. However, in the presently disclosed embodiment, since the current phase of the primary coil is already delayed from the switching phase (see b), the current phase when the duty control is performed is further delayed from the on phase (see c and d) so that hard switching does not occur. In this event, some dead time (Dead time) is required for preventing (Q2 and Q1) from turning on simultaneously, which, however, is generally performed so that a description thereof is omitted.

Figure 21:
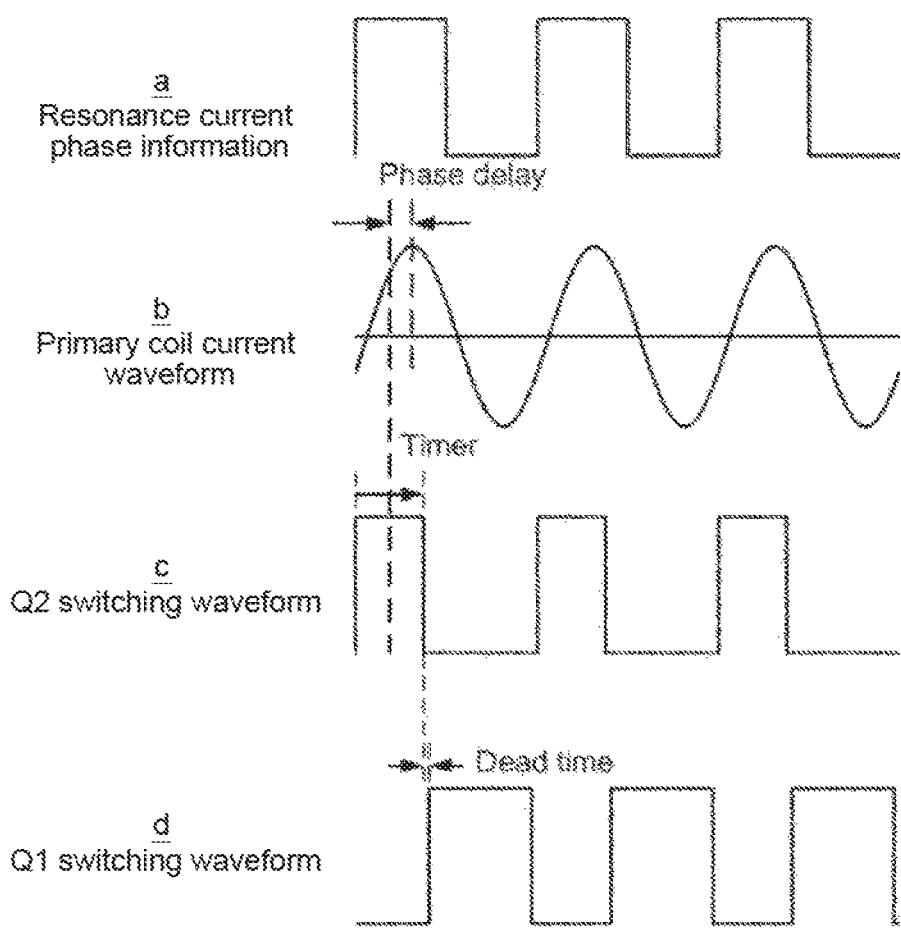
FIG. 21 is a diagram for explaining another example of the power control according to the presently disclosed embodiment.

FIG. 21 is a diagram for explaining another example of the power control according to the presently disclosed embodiment. In this power control, the duty control is performed for only one of the switching means or only a pair of the switching means which turn on simultaneously, and the other or the other pair is controlled by an inverted signal. In this event, some dead time (Dead time) is likewise required for the other or the other pair controlled by the inverted signal (see d).

Such a control method is called unbalanced half-bridge control or unbalanced full-bridge control. In this control method, even harmonic voltage tends to be generated in the secondary coil. However, in the presently disclosed embodiment, since the Q value is set very high, the voltage of the secondary coil is approximately a sine wave and thus there is no problem.

Figure 22:
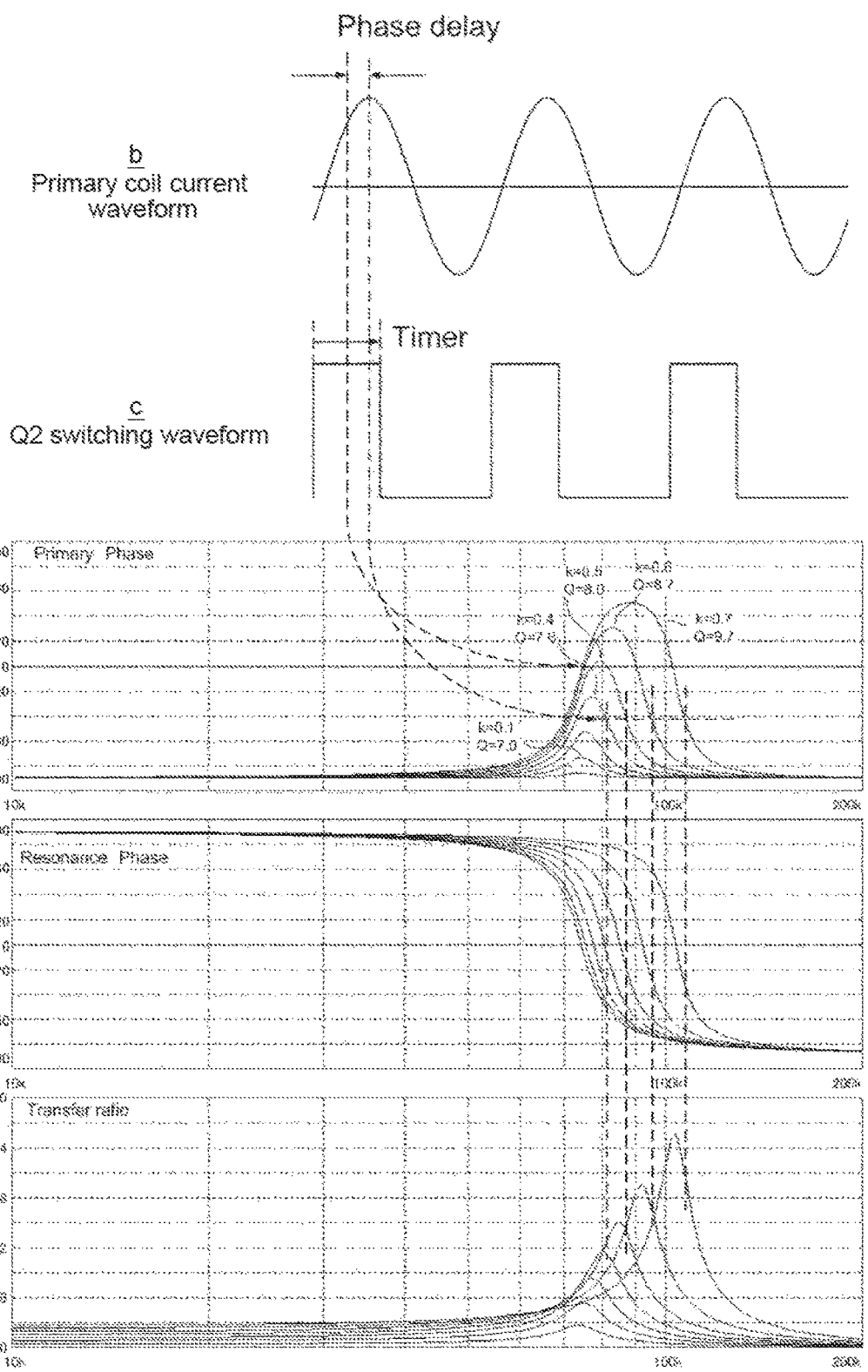
FIG. 22 is a diagram for explaining the relationship with the current phase of a primary coil when the power control of the presently disclosed embodiment is performed.

FIG. 22 is a diagram for explaining the relationship with the current phase of the primary coil when the power control of the presently disclosed embodiment is performed.

In the control method of the presently disclosed embodiment, the driving frequency when controlled increases and, as is also clear from FIG. 22, it is seen that as the frequency increases, the on phase of a driving voltage is further delayed from the phase of phase information of a resonance current. While the power factor decreases, since the transfer ratio decreases simultaneously, the controllable power range is greatly widened.

In the wireless power transfer system described above, the resonance circuit is formed by connecting the resonance capacitor to the secondary coil. On the other hand, for example, in the Qi standard using the electromagnetic induction type, the secondary-side resonance circuit as in the presently disclosed embodiment is not essential. Therefore, in order to apply the presently disclosed embodiment while ensuring the interchangeability with the Qi standard, a description will be given of the case where, like in FIG. 5C, a third coil is provided side by side with the secondary coil and the power is extracted to a load from this third coil.

Figure 23:
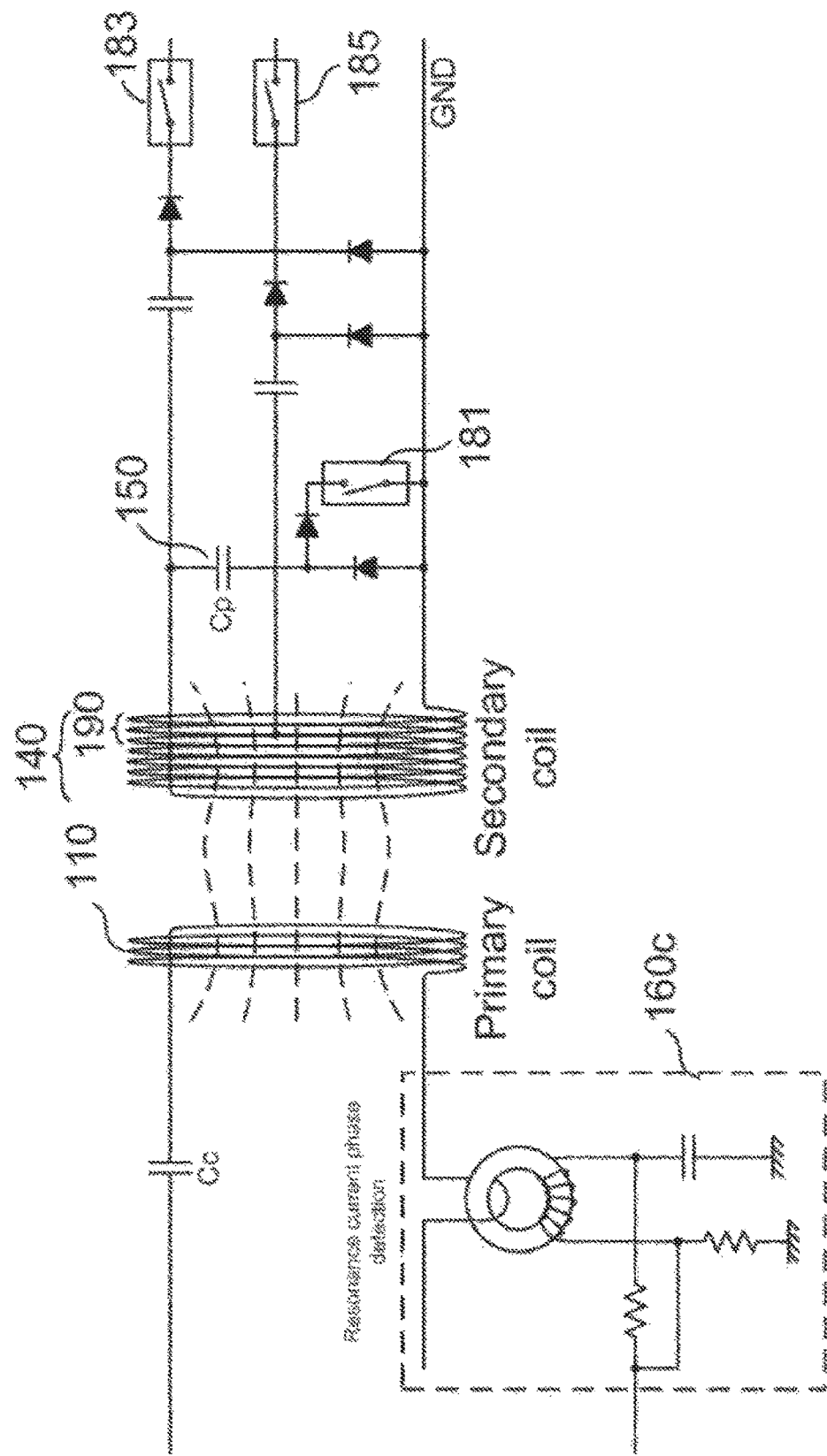
FIG. 23 is a diagram showing one example of a circuit that can improve the efficiency while maintaining the interchangeability with the Qi standard.
Figure 24:
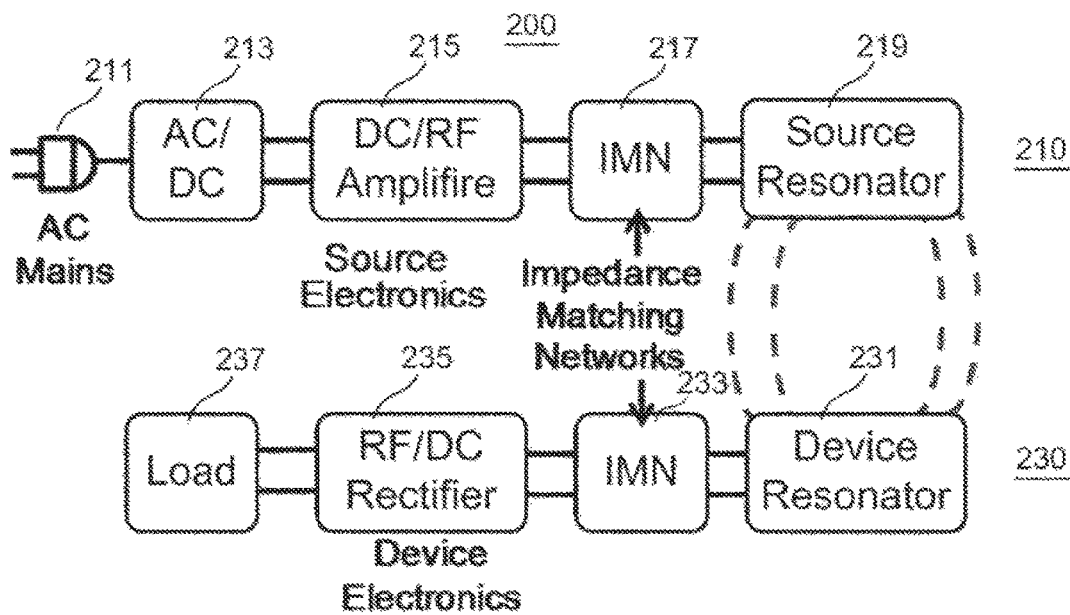
FIG. 24 is a block diagram showing a configuration of a conventional magnetic field resonance type wireless power transfer system.
Figure 25:
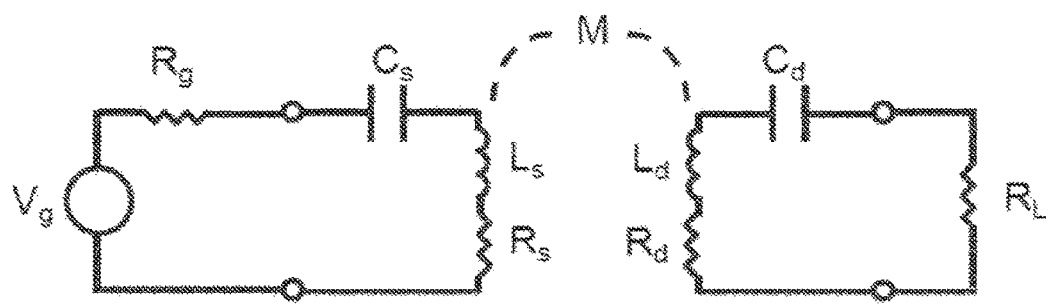
FIG. 25 is an equivalent circuit diagram of the conventional magnetic field resonance type wireless power transfer system.

FIG. 23 is a diagram showing one example of a circuit that can improve the efficiency while maintaining the interchangeability with the Qi standard. Like in FIG. 5C, a third coil 190 may be provided as an independent coil close to a secondary coil 140, or alternatively, as shown in FIG. 23 or FIG. 5B, a third coil 190 may be included as an autotransformer in a secondary coil 140 and may be wound so as to step down a voltage induced in the secondary coil 140.

A resonance capacitor (Cp) 150 is connected to the secondary coil 140 and, in the case of a Qi interchangeable standard, a switch 181 is turned off to disable resonance operation, while, when improving the efficiency, the switch 181 is turned on so that Cp operates as the resonance capacitor 150. Simultaneously, a switch 183 on the secondary coil 140 side is turned off, while a switch 185 is turned on. A load not shown is connected between the switches 183 and 185 and secondary-side GND. When the switch 181 is turned on, the Q value of the resonance circuit increases.

With this operation, since a frequency with an excellent power factor occurs in a primary coil 110, a resonance current waveform detected by a resonance current phase detection means 160c provided on the primary side and its inverted integrated waveform are combined to perform phase correction and, based on its resonance current phase information, a driving circuit of a high-frequency power source is driven. In the circuit of FIG. 23, the switches 181, 183, and 185 respectively uses FETs or transistors via diodes. However, being not limited thereto, any elements can be used if they are capable of switching operation.

When the third coil is wound so as to step down a voltage induced in the secondary coil as in FIG. 5C, FIG. 5B, or FIG. 23, the load resistance connected to the third coil is impedance-converted in inverse proportion to the square of a step-down ratio so that a high-value equivalent load resistance is virtually connected to the secondary coil. Therefore, the Q value of the resonance circuit can be set high in accordance with this ratio. By setting this step-down ratio, the Q value can be easily set to a desired value greater than or equal to a value determined by $Q=2/k^2$.

Further, since the resonance current is inversely proportional to the number of windings, the copper loss due to the resonance current decreases in proportion to the square of the current and therefore it is possible to reduce heat generation so that the efficiency is improved.

DESCRIPTION OF REFERENCE NUMERALS

100 WIRELESS POWER TRANSFER SYSTEM
110 PRIMARY COIL
120 DRIVING CIRCUIT
122 DRIVING MEANS
124 SWITCHING MEANS
140 SECONDARY COIL
150 RESONANCE CAPACITOR
155 SMALL-CAPACITY CAPACITOR
160 RESONANCE CURRENT PHASE DETECTION MEANS
165 FILTER
170 PHASE INFORMATION TRANSFER MEANS
190 THIRD COIL

What is claimed is:

1. A wireless power transfer system in which a primary coil connected to a high-frequency power source and a secondary coil connected to a load are disposed so as to be isolated from each other with a coupling coefficient k, thereby supplying power from the primary coil to the secondary coil in a non-contact manner, the system comprising:
a resonance current phase detection means forming a resonance circuit by connecting a resonance capacitor to the secondary coil and configured to detect phase information of a resonance current flowing through the resonance capacitor;
a phase information transfer means configured to transfer the detected phase information without phase delay; and
a driving circuit configured to determine, based on the phase information, a driving frequency so that a current phase of a driving current flowing in the primary coil slightly delays from a voltage phase of a driving voltage applied to the primary coil, thereby driving the primary coil,
wherein a Q value determined based on a leakage inductance of the secondary coil, a capacitance of the resonance capacitor, and an equivalent load resistance on the secondary coil side is set to a value greater than or equal to a value determined by $Q=2/k^2$.

2. A wireless power transfer system in which a primary coil connected to a high-frequency power source and a secondary coil connected to a load are disposed so as to be isolated from each other with a coupling coefficient k, thereby supplying power from the primary coil to the secondary coil in a non-contact manner, the system comprising:
a resonance current phase detection means forming a resonance circuit by connecting a resonance capacitor to the secondary coil and configured to detect phase information of a resonance current flowing in the secondary coil;
a phase information transfer means configured to transfer the detected phase information without phase delay; and
a driving circuit configured to determine, based on the phase information, a driving frequency so that a current phase of a driving current flowing in the primary coil slightly delays from a voltage phase of a driving voltage applied to the primary coil, thereby driving the primary coil,
wherein a Q value determined based on a leakage inductance of the secondary coil, a capacitance of the resonance capacitor, and an equivalent load resistance on the secondary coil side is set to a value greater than or equal to a value determined by $Q=2/k^2$.

3. A wireless power transfer system in which a primary coil connected to a high-frequency power source and a secondary coil connected to a load are disposed so as to be isolated from each other with a coupling coefficient k, thereby supplying power from the primary coil to the secondary coil in a non-contact manner, the system comprising:
a resonance current phase detection means forming a resonance circuit by connecting a resonance capacitor to the secondary coil and configured to detect, from the primary coil, phase information of a resonance current flowing in the resonance circuit;
a phase information transfer means configured to transfer the detected phase information without phase delay; and
a driving circuit configured to determine, based on the phase information, a driving frequency so that a current phase of a driving current flowing in the primary coil slightly delays from a voltage phase of a driving voltage applied to the primary coil, thereby driving the primary coil,
wherein a Q value determined based on a leakage inductance of the secondary coil, a capacitance of the resonance capacitor, and an equivalent load resistance on the secondary coil side is set to a value greater than or equal to a value determined by $Q=2/k^2$.

4. A wireless power transfer system in which a primary coil connected to a high-frequency power source and a secondary coil connected to a load are disposed so as to be isolated from each other with a coupling coefficient k, thereby supplying power from the primary coil to the secondary coil in a non-contact manner, the system comprising:
a resonance current phase detection means forming a resonance circuit by connecting a resonance capacitor to the secondary coil and configured to detect phase information of a resonance current based on a waveform obtained by superimposing and combining one of a waveform of a resonance current flowing through the resonance capacitor, a waveform of a resonance current flowing in the secondary coil, and a waveform of a resonance current flowing in the primary coil, and an inverted integrated waveform of the one of the waveforms;
a phase information transfer means configured to transfer the detected phase information without phase delay; and
a driving circuit configured to determine, based on the phase information, a driving frequency so that a current phase of a driving current flowing in the primary coil slightly delays from a voltage phase of a driving voltage applied to the primary coil, thereby driving the primary coil, wherein a Q value determined based on a leakage inductance of the secondary coil, a capacitance of the resonance capacitor, and an equivalent load resistance on the secondary coil side is set to a value greater than or equal to a value determined by $Q=2/k^2$.

5. The wireless power transfer system according to claim 1, comprising a filter configured to remove distortion included in a waveform of the resonance current and to extract only a fundamental wave.

6. The wireless power transfer system according to claim 1,
wherein the driving circuit includes a switching means configured to drive the primary coil, and
wherein the switching means performs power control by changing an on-off duty cycle thereof, turning on the switching means based on the phase information, and turning off the switching means after a lapse of a predetermined time.

7. The wireless power transfer system according to claim 1, wherein the resonance current phase detection means detects the phase information from a current flowing through a small-capacity capacitor connected in parallel to the resonance capacitor.

8. A wireless power transfer system including a primary coil connected to a high-frequency power source, a secondary coil connected to a load, and a third coil disposed close to the secondary coil or including the secondary coil as an autotransformer and wound so as to step down a voltage induced in the secondary coil, wherein the primary coil and the secondary coil are disposed so as to be isolated from each other with a coupling coefficient k, thereby supplying power from the primary coil to the third coil via the secondary coil in a non-contact manner, the system comprising:
a resonance current phase detection means forming a resonance circuit by connecting a resonance capacitor to the secondary coil and configured to detect phase information of a resonance current flowing through the resonance capacitor;
a phase information transfer means configured to transfer the detected phase information without phase delay; and
a driving circuit configured to determine, based on the phase information, a driving frequency so that a current phase of a driving current flowing in the primary coil slightly delays from a voltage phase of a driving voltage applied to the primary coil, thereby driving the primary coil,
wherein a Q value determined based on a leakage inductance of the secondary coil, a capacitance of the resonance capacitor, and an equivalent load resistance on the secondary coil side is set to a value greater than or equal to a value determined by $Q=2/k^2$.

9. A wireless power transfer system including a primary coil connected to a high-frequency power source, a secondary coil connected to a load, and a third coil disposed close to the secondary coil or including in an autotransformer including the secondary coil, the third coil being wound so as to step down a voltage induced in the secondary coil, wherein the primary coil and the secondary coil are disposed so as to be isolated from each other with a coupling coefficient k, thereby supplying power from the primary coil to the secondary coil in a non-contact manner, the system comprising:
a resonance current phase detection means forming a resonance circuit by connecting a resonance capacitor to the secondary coil and configured to detect phase information of a resonance current flowing in the secondary coil;
a phase information transfer means configured to transfer the detected phase information without phase delay; and
a driving circuit configured to determine, based on the phase information, a driving frequency so that a current phase of a driving current flowing in the primary coil slightly delays from a voltage phase of a driving voltage applied to the primary coil, thereby driving the primary coil,
wherein a Q value determined based on a leakage inductance of the secondary coil, a capacitance of the resonance capacitor, and an equivalent load resistance on the secondary coil side is set to a value greater than or equal to a value determined by $Q=2/k^2$.

10. A wireless power transfer system including a primary coil connected to a high-frequency power source, a secondary coil connected to a load, and a third coil disposed close to the secondary coil or included in an autotransformer including the secondary coil, the third coil being wound so as to step down a voltage induced in the secondary coil, wherein the primary coil and the secondary coil are disposed so as to be isolated from each other with a coupling coefficient k, thereby supplying power from the primary coil to the secondary coil in a non-contact manner, the system comprising:
a resonance current phase detection means forming a resonance circuit by connecting a resonance capacitor to the secondary coil and configured to detect, from the primary coil, phase information of a resonance current flowing in the resonance circuit;
a phase information transfer means configured to transfer the detected phase information without phase delay; and
a driving circuit configured to determine, based on the phase information, a driving frequency so that a current phase of a driving current flowing in the primary coil slightly delays from a voltage phase of a driving voltage applied to the primary coil, thereby driving the primary coil,
wherein a Q value determined based on a leakage inductance of the secondary coil, a capacitance of the resonance capacitor, and an equivalent load resistance on the secondary coil side is set to a value greater than or equal to a value determined by $Q=2/k^2$.

11. A wireless power transfer system including a primary coil connected to a high-frequency power source, a secondary coil connected to a load, and a third coil disposed close to the secondary coil or included in an autotransformer including the secondary coil, the third coil being wound so as to step down a voltage induced in the secondary coil, wherein the primary coil and the secondary coil are disposed so as to be isolated from each other with a coupling coefficient k, thereby supplying power from the primary coil to the secondary coil in a non-contact manner, the system comprising:
a resonance current phase detection means forming a resonance circuit by connecting a resonance capacitor to the secondary coil and configured to detect phase information of a resonance current based on a waveform obtained by superimposing and combining one of a waveform of a resonance current flowing through the resonance capacitor, a waveform of a resonance current flowing in the secondary coil, and a waveform of a resonance current flowing in the primary coil, and an inverted integrated waveform of the one of the waveforms;

a phase information transfer means configured to transfer the detected phase information without phase delay; and a driving circuit configured to determine, based on the phase information, a driving frequency so that a current phase of a driving current flowing in the primary coil slightly delays from a voltage phase of a driving voltage applied to the primary coil, thereby driving the primary coil, wherein a Q value determined based on a leakage inductance of the secondary coil, a capacitance of the resonance capacitor, and an equivalent load resistance on the secondary coil side is set to a value greater than or equal to a value determined by $Q=2/k^2$.

12. The wireless power transfer system according to claim 8, comprising a filter configured to remove distortion included in a waveform of the resonance current and to extract only a fundamental wave.

13. The wireless power transfer system according to claim 8, wherein the driving circuit includes a switching means configured to drive the primary coil, and wherein the switching means performs power control by changing an on-off duty cycle thereof, turning on the switching means based on the phase information, and turning off the switching means after a lapse of a predetermined time.

14. The wireless power transfer system according to claim 8, wherein the resonance current phase detection means detects the phase information from a current flowing through a small-capacity capacitor connected in parallel to the resonance capacitor.

* * * * *